(12) United States Patent
Okamoto et al.

(10) Patent No.: US 6,987,141 B2
(45) Date of Patent: Jan. 17, 2006

(54) POLYCARBONATE RESIN COMPOSITION

(75) Inventors: Masaya Okamoto, Ibaraki (JP); Akio Nodera, Chiba (JP); Yasuhiro Ishikawa, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 88 days.

(21) Appl. No.: 10/415,108

(22) PCT Filed: Oct. 25, 2001

(86) PCT No.: PCT/JP01/09393

§ 371 (c)(1),
(2), (4) Date: May 1, 2003

(87) PCT Pub. No.: WO02/036687

PCT Pub. Date: Oct. 5, 2002

(65) Prior Publication Data

US 2004/0030044 A1    Feb. 12, 2004

(30) Foreign Application Priority Data

Nov. 1, 2000   (JP) ............................. 2000-334123
Nov. 16, 2000  (JP) ............................. 2000-349454
Nov. 16, 2000  (JP) ............................. 2000-349455

(51) Int. Cl.
*C08L 69/00* (2006.01)

(52) U.S. Cl. ....................... 524/494; 524/611; 528/204

(58) Field of Classification Search ................. 528/204; 524/494, 611
See application file for complete search history.

(56) References Cited

U.S. PATENT DOCUMENTS

| | | | | |
|---|---|---|---|---|
| 3,507,951 A | * | 4/1970 | Bailey et al. ................ 264/349 |
| 4,631,334 A | | 12/1986 | Masumoto et al. | |
| 4,732,949 A | * | 3/1988 | Paul et al. ................... 525/464 |
| 5,015,670 A | * | 5/1991 | Takada et al. ............... 523/214 |
| 5,534,584 A | * | 7/1996 | Kitamura et al. ........... 524/497 |
| 5,840,791 A | | 11/1998 | Magerstedt et al. | |
| 5,852,098 A | * | 12/1998 | Kohler et al. ............... 524/494 |
| 6,294,641 B1 | * | 9/2001 | Miyamoto et al. .......... 528/196 |
| 2003/0008965 A1 | * | 1/2003 | Okamoto et al. ........... 524/494 |

FOREIGN PATENT DOCUMENTS

| | | |
|---|---|---|
| EP | 0375945 A1 | 7/1990 |
| EP | 0 389 055 A2 | 9/1990 |
| EP | 0 434 997 A2 | 7/1991 |
| EP | 0522751 A3 | 1/1993 |
| EP | 0595141 A1 | 5/1994 |
| EP | 0692522 A2 | 1/1996 |
| EP | 969031 | 1/2000 |
| JP | 60-203632 | 10/1985 |
| JP | WO 01/57136 | 8/2001 |
| WO | W0-99/36456 * | 7/1999 |

OTHER PUBLICATIONS

English abstract from esp@cenet of WO157136.
Supplementary European Search Report (Apr. 25, 2005).
esp@cenet—English Abstract of JP60203632.

* cited by examiner

*Primary Examiner*—David J. Buttner
(74) *Attorney, Agent, or Firm*—Oblon, Spivak, McClelland, Maier & Neustadt, P.C

(57) ABSTRACT

The invention relates to a polycarbonate resin composition, including (1) a colored composition that comprises two types of specifically-terminated aromatic polycarbonates along with an inorganic filler added thereto, (2) a composition that comprises a polycarbonate resin terminated with a specific phenoxy group, a functional group-having silicone compound and a core/shell-type grafted rubber-like elastomer, and (3) a composition that comprises a specifically-terminated aromatic polycarbonate-polyorganosiloxane copolymer, a specifically-terminated aromatic polycarbonate and a fibril-forming polytetrafluoroethylene.

10 Claims, 1 Drawing Sheet

POLYCARBONATE RESIN COMPOSITION

TECHNICAL FIELD

The present invention includes first to third aspects all relating to a polycarbonate resin composition. Precisely, the first aspect of the invention relates to a colored polycarbonate resin composition of good flowability and impact resistance, of which the injection moldings are especially glossy; the second aspect thereof relates to a polycarbonate resin composition of good impact resistance, moldability (melt flowability) and flame retardancy, not containing a halogen or phosphorus-containing flame retardant, and to its moldings; and the third aspect of the invention relates to a polycarbonate resin composition of good flowability, impact resistance and flame retardancy.

BACKGROUND ART

Having the advantages of mechanical strength (impact resistance), heat resistance and good electric properties, polycarbonate resins serve as engineering plastics and have many applications in various fields of, for example, electric and electronic appliances and automobile parts. Above all, colored polycarbonates are used, for example, for parts of electric and electronic appliances, parts of electrically-powered tools and parts of cameras. Glass fibers serving as an inorganic filler are added to such polycarbonate resins for improving the stiffness and dimensional stability of the resin articles, and they are known as glass fiber-reinforced polycarbonate resins.

Such glass fiber-reinforced polycarbonate resins are used for thin-wall moldings these days, and it is desired to increase the flowability of the resins. Lowering the molecular weight of polycarbonate is effective for increasing the resin flowability, which, however, greatly lowers the impact resistance of the resin articles.

To solve the problem, proposed are a composition that comprises a glass fiber-reinforced polycarbonate resin and an organosiloxane (Japanese Patent Publication No. 35929/1984, International Patent Publication No. 501860/1982) and a polycarbonate-polyorganosiloxane copolymer reinforced with glass fibers (Japanese Patent Laid-Open No. 173061/1990). The techniques proposed are to improve the balance of the resin flowability and the impact resistance of the resin articles, but are still unsatisfactory. Another problem with colored polycarbonate compositions is that the glossiness of their injection moldings is not good when ordinary polycarbonate is used in the compositions.

The first aspect of the invention has been made in consideration of the situation as above, and its object is to provide a colored polycarbonate resin composition of which the advantages are that its flowability is improved not detracting from the impact resistance of the resin moldings, and especially the glossiness of the injection moldings of the resin composition is extremely good.

As a rule, polycarbonate resins are self-extinguishable. However, in some fields of typically OA appliances, information and communication appliances, and other electric and electronic appliances for household use, required are polycarbonate resins of more improved flame retardancy. For these, various flame retardants are added to polycarbonate resins to meet the requirement.

For improving the flame retardancy of polycarbonate resins, halogen-containing flame retardants such as bisphenol A halides and halogenated polycarbonate oligomers have been used along with a flame retardation promoter such as antimony oxide, as their flame-retarding ability is good.

However, with the recent tendency toward safety living and environmental protection from discarded and incinerated wastes, the market requires flame retardation with non-halogen flame retardants. As non-halogen flame retardants, phosphorus-containing organic flame retardants, especially organic phosphate compounds may be added to polycarbonate resin compositions, for which various methods have been proposed. Such flame retardants, organic phosphate compounds serve also as a plasticizer, and polycarbonate resin compositions containing them exhibit excellent flame retardancy.

However, in order to make polycarbonate resins have good flame retardancy by adding thereto a phosphate compound, a relatively large amount of the compound must be added to the resins. In general, polycarbonate resins require relatively high molding temperatures, and their melt viscosity is high. Therefore, for molding them into thin-walled and large-sized moldings, the molding temperature will have to be higher. For these reasons, phosphate compounds often cause some problems when added to such polycarbonate resins, though their flame-retarding ability is good. For example, phosphate compounds often corrode molds used for molding resins containing them, and generate gas to have some unfavorable influences on the working environments and even on the appearance of the moldings. Another problem with phosphate compounds is that, when the moldings containing them are left under heat or in high-temperature and high-humidity conditions, the compounds lower the impact strength of the moldings and yellow the moldings. In addition, polycarbonate resin compositions containing phosphate compounds are not stable under heat, and therefore do not meet the recent requirement for recycling resin products. This is still another problem with phosphate compounds.

Apart from the above, proposed is another technique of adding silicone compounds to polycarbonate resins to make the resins have flame retardancy. In this, silicone compounds added to the resins do not give toxic gas when fired. For example, (1) Japanese Patent Laid-Open No. 139964/1998 discloses a flame retardant that comprises a silicone resin having a specific structure and a specific molecular weight.

(2) Japanese Patent Laid-Open Nos. 45160/1976, 318069/1989, 306265/1994, 12868/1996, 295796/1996, and Japanese Patent Publication No. 48947/1991 disclose silicone-containing, flame-retardant polycarbonate resin compositions.

The flame retardancy level of the products in (1) is high in some degree, but the impact resistance thereof is often low. The technology of (2) differs from that of (1) in that the silicones used in (2) do not act as a flame retardant by themselves, but are for improving the dropping resistance of resins, and some examples of silicones for that purpose are mentioned. Anyhow, in (2), the resins indispensably require an additional flame retardant of, for example, phosphate compounds or metal salts of Group 2 of the Periodic Table. Another problem with the flame-retardant polycarbonate resin compositions in (2) is that the flame retardant added thereto worsens the moldability and even the physical properties of the resin compositions and their moldings.

Also known is a flame-retardant polycarbonate resin composition that comprises a polycarbonate-polyorganosiloxane copolymer-containing resin (this is one type of polycarbonate resin) and contains a fibril-forming polytetrafluoroethylene (Japanese Patent Laid-Open No. 81620/1996). Even though its polyorganosiloxane content is low, falling within a specifically defined range, the composition exhibits good flame retardancy. However, the composition is problematic in that its impact resistance characteristic of polycarbonate resin is often not good though its flame retardancy is good.

The second aspect of the invention has been made in consideration of the situation as above, and its object is to provide a polycarbonate resin composition of which the advantages are that its moldability, or that is, melt flowability is improved not detracting from the impact resistance thereof characteristic of polycarbonate resin, its flame retardancy, heat resistance and recyclability are all good, and it can be molded into thin-walled moldings that are lightweight and save natural resources, and to provide such moldings of the composition.

Of various thermoplastic resins, polycarbonate resins have a high oxidation index and are therefore self-extinguishable. In general, however, the flame retardancy level needed in the field of OA appliances and other electric and electronic appliances is high, concretely, V-0 as the UL94 Standard. For making those appliances resistant to flames to the desired level, therefore, flame retardant and flame retardation promoter are added thereto. However, the additives lower the impact resistance and the heat resistance of the appliances.

In particular, flame-retardant materials of good flowability are desired these days for large-sized and thin-walled moldings for housings of copiers and printers. The flowability of polycarbonate-polyorganosiloxane copolymers could be increased by reducing the molecular weight thereof according to the technology mentioned above, but this is problematic in that the impact resistance of the copolymers is low. On the other hand, the flowability of polycarbonate resins could also be increased by reducing the molecular weight thereof, but this is also problematic in that the flame retardancy and the impact resistance of the resins are low The third aspect of the invention has been made in consideration of the situation as above, and its object is to provide a polycarbonate resin composition of good flowability, impact resistance and flame retardancy.

DISCLOSURE OF THE INVENTION

We, the present inventors have assiduously studied, and, as a result, have found that the object of the invention mentioned above can be attained by using an aromatic polycarbonate resin having a specific terminal group. On the basis of this finding, we have completed the first aspect of the invention.

Specifically, the first aspect of the invention is summarized as follows:

1. A colored polycarbonate resin composition, which comprises 100 parts by weight of a polycarbonate resin comprising from 10 to 100% by weight of an aromatic polycarbonate (A) having a terminal group of the following general formula (I-1):

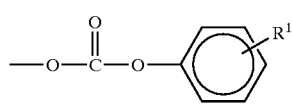

wherein $R^1$ represents an alkyl group having from 10 to 35 carbon atoms, and from 0 to 90% by weight of an aromatic polycarbonate (B) having a terminal group of the following general formula (I-2):

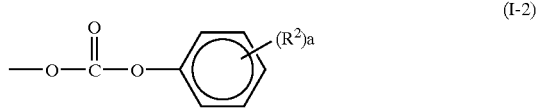

wherein $R^2$ represents an alkyl group having from 1 to 9 carbon atoms, an aryl group having from 6 to 20 carbon atoms, or a halogen atom, and a indicates an integer of from 0 to 5, and from 5 to 150 parts by weight of an inorganic filler (C).

2. The polycarbonate resin composition of above 1, wherein the inorganic filler (C) is glass fibers.

3. The polycarbonate resin composition of above 1 or 2, wherein $R^1$ in formula (I-1) is a branched alkyl group having from 10 to 35 carbon atoms.

4. The polycarbonate resin composition of any of above 1 to 3, wherein the polycarbonate resin has a viscosity-average molecular weight of from 10,000 to 40,000.

5. Parts of electric and electronic appliances, parts of electrically-powered tools and parts of cameras, for which is used the polycarbonate resin composition of any of above 1 to 4.

We, the inventors have further studied how to improve the impact resistance, the heat resistance, the recyclability and the moldability of polycarbonate resin in making the resin resistant to flames by the silicone compound.

As a result, we have found that, when a specific polycarbonate resin is combined selectively with <1> a specific minor silicon compound and a specific rubber-like elastomer or with <2> a styrenic resin and a specific fluororesin in preparing a polycarbonate resin composition, then the moldability and the flame retardancy of the resin composition are significantly improved not detracting from the impact resistance thereof. On the basis of these findings, we have completed the second aspect of the invention.

Specifically, the second aspect of the invention provides the following:

1. A polycarbonate resin composition, which comprises 100 parts by weight of a polycarbonate-based resin (A) that contains a polycarbonate resin terminated with a phenoxy group having an alkyl group with from 21 to 35 carbon atoms, from 0.1 to 10 parts by weight of a functional group-having silicone compound (B), and from 0.2 to 10 parts by weight of a core/shell-type, grafted rubber-like elastomer (C).

2. The polycarbonate resin composition of above 1, wherein the polycarbonate-based resin (A) contains at least a polycarbonate-polyorganosiloxane copolymer and the polyorganosiloxane content of the polycarbonate-based resin is from 0.1 to 10% by weight.

3. The polycarbonate resin composition of above 1 or 2, which further contains from 0.02 to 5 parts by weight, relative to 100 parts by weight of the polycarbonate-based resin (A) therein, a polyfluoro-olefin resin (D).

4. A polycarbonate resin composition, which comprises 100 parts by weight of a resin mixture of from 1 to 99% by weight of a polycarbonate-based resin (A) that contains a polycarbonate resin terminated with an alkylphenol of which the alkyl group has from 21 to 35 carbon atoms, and from 1 to 99% by weight of a styrenic resin (E), and from 0.01 to 5 parts by weight of a polyfluoro-olefin resin (D).

5. The polycarbonate resin composition of above 4, wherein the polycarbonate-based resin (A) contains at least a polycarbonate-polyorganosiloxane copolymer and the polyorganosiloxane content of the polycarbonate-based resin is from 0.1 to 10% by weight.

6. The polycarbonate resin composition of above 4 or 5, wherein the resin mixture comprises from 70 to 98% by weight of the polycarbonate-based resin (A) and from 2 to 30% by weight of a rubber-modified styrenic resin as the component (E).

7. The polycarbonate resin composition of any of above 4 to 6, which further contains from 0.1 to 10 parts by weight, relative to 100 parts by weight of the resin mixture of (A) and (E) therein, a functional group-having silicone compound (B).

8. The polycarbonate resin composition of any of above 4 to 7, which further contains from 1 to 100 parts by weight, relative to 100 parts by weight of the resin mixture of (A) and (E) therein, an inorganic filler (F).

9. Moldings of the polycarbonate resin composition of any of above 1 to 8.

10. Housings or parts of electric and electronic appliances, for which is used the polycarbonate resin composition of any of above 1 to 8.

We, the inventors have still further studied, and as a result, we have found that the object of the invention mentioned above can be attained by a polycarbonate resin composition comprising <1> an aromatic polycarbonate resin that contains an aromatic polycarbonate-polyorganosiloxane copolymer having an ordinary terminal group and an aromatic polycarbonate having a specific terminal group or <2> an aromatic polycarbonate resin that contains an aromatic polycarbonate-polyorganosiloxane copolymer having a specific terminal group, and a specific polytetrafluoroethylene added thereto. On the basis of these findings, we have completed the third aspect of the invention.

Specifically, the third aspect of the invention is summarized as follows:

1. A polycarbonate resin composition, which comprises 100 parts by weight of an aromatic polycarbonate resin that contains an aromatic polycarbonate-polyorganosiloxane copolymer (A) having a terminal group of the following general formula (III-1):

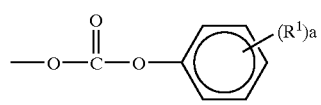
(III-1)

wherein $R^1$ represents an alkyl group having from 1 to 9 carbon atoms, an aryl group having from 6 to 20 carbon atoms, or a halogen atom, and a indicates an integer of from 0 to 5, and an aromatic polycarbonate (B) having a terminal group of the following general formula (III-2):

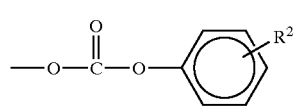
(III-2)

wherein $R^2$ represents an alkyl group having from 21 to 35 carbon atoms, and from 0.05 to 1 part by weight of a fibril-forming polytetrafluoroethylene (C) having a mean molecular weight of at least 500,000.

2. The polycarbonate resin composition of above 1, wherein the aromatic polycarbonate resin that contains the components (A) and (B) has a viscosity-average molecular weight of from 10,000 to 40,000.

3. The polycarbonate resin composition of above 1 or 2, wherein the polyorganosiloxane content of the component (A) is from 0.1 to 2% by weight of the aromatic polycarbonate resin that contains the components (A) and (B).

4. The polycarbonate resin composition of any of above 1 to 3, wherein the ratio of the component (B) is at least 10% by weight of the aromatic polycarbonate resin that contains the components (A) and (B).

5. A polycarbonate resin composition, which comprises 100 parts by weight of an aromatic polycarbonate resin that contains an aromatic polycarbonate-polyorganosiloxane copolymer (D) having a terminal group of the following general formula (III-2'):

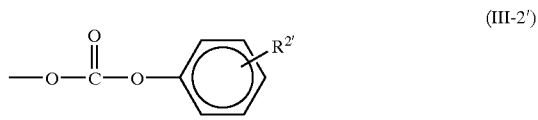
(III-2')

wherein $R^2$ represents an alkyl group having from 21 to 35 carbon atoms, and from 0.05 to 1 part by weight of a fibril-forming polytetrafluoroethylene (C) having a mean molecular weight of at least 500,000.

6. The polycarbonate resin composition of above 5, wherein the aromatic polycarbonate resin that contains the component (D) has a viscosity-average molecular weight of from 10,000 to 40,000.

7. The polycarbonate resin composition of above 5 or 6, wherein the polyorganosiloxane content of the component (D) is from 0.1 to 2% by weight of the aromatic polycarbonate resin that contains the component (D).

8. Housings or parts of electric and electronic appliances, for which is used the polycarbonate resin composition of any of above 1 to 7.

BEST MODES OF CARRYING OUT THE INVENTION

Figure 1:
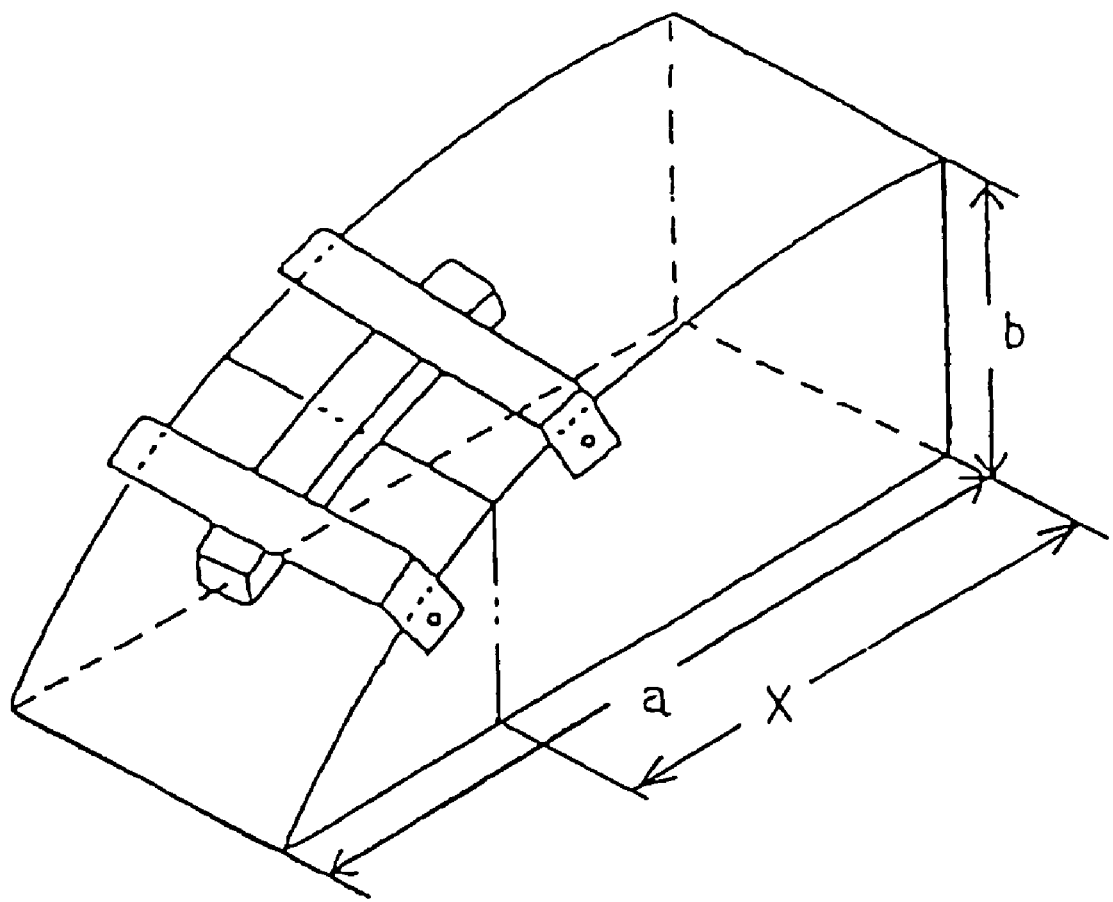
FIG. 1 is a perspective view of a tool for holding a test piece thereon for evaluating the grease resistance of the composition of the second aspect of the invention.

The invention is described in detail hereinunder.

[I] First Aspect of the Invention:

The component (A) of the polycarbonate resin composition of the first aspect of the invention (in this section, the "first aspect of the invention" will be simply referred to as "the invention") is an aromatic polycarbonate having a terminal group of formula (I-1) mentioned above. In formula (I-1), $R^1$ represents an alkyl group having from 10 to 35 carbon atoms, and it may be linear or branched.

The aromatic polycarbonate may be produced in any known method of generally reacting a biphenol with a polycarbonate precursor such as phosgene or a carbonate compound. Concretely, for example, it may be produced by reacting a diphenol with a polycarbonate precursor such as phosgene or by interesterifying a carbonate precursor such as diphenyl carbonate with a diphenol, in a solvent such as methylene chloride in the presence of a known acid receptor and a long-chain alkylphenol serving as a terminal stopper of the following formula (I-3):

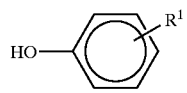

(I-3)

wherein R¹ has the same meaning as above, optionally with adding a branching agent to the reaction system.

Various types of diphenols are known, and 2,2-bis(4-hydroxyphenyl)propane (generally referred to as bisphenol A) is favorable to the invention. Except bisphenol A, other diphenols usable herein are, for example, bis(hydroxyaryl) alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-1-methylphenyl)propane, 1,1-bis(4-hydroxy-tert-butylphenyl) propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane, 2,2-bis(4-hydroxy-3,5-tetrabromophenyl)propane; bis(hydroxyaryl)arylalkanes such as 2,2-bis(4-hydroxyphenyl)phenylmethane, bis(4-hydroxyphenyl)naphthylmethane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane; dihydroxyaryl ethers such as 4,4'-dihydroxyphenyl ether, 4,4'-dihydroxy-3,3'-dimethylphenyl ether; dihydroxydiaryl sulfides such as 4,4'-dihydroxydiphenyl sulfide, 4,4'-dihydroxy-3,3'-dimethyldiphenyl sulfide; dihydroxydiaryl sulfoxides such as 4,4'-dihydoxydiphenyl sulfoxide, 4,4'-dihydroxy-3,3'-dimethyldiphenyl sulfoxide; dihydroxydiaryl sulfones such as 4,4'-dihydoxydiphenyl sulfone, 4,4'-dihydroxy-3,3'-dimethyldiphenyl sulfone; and dihydroxydiphenyls such as 4,4'-dihydroxydiphenyl. Singly or as combined, one or more of these diphenols may be used for the reaction.

The carbonate compound includes, for example, diaryl carbonates such as diphenyl carbonate; and dialkyl carbonates such as dimethyl carbonate, diethyl carbonate.

For the terminal stopper, used are long-chain monoalkylphenols of formula (I-3), of which p-alkylphenols are especially preferred for use herein. In the formula, R¹ represents an alkyl group having from 10 to 35 carbon atoms, and it may be linear or branched but is preferably branched. R¹ is preferably an alkyl group having from 12 to 24 carbon atoms.

If the number of carbon atoms constituting the alkyl group is 9 or less, it is unfavorable since the flowability of the aromatic polycarbonate resin is low; but if 36 or more, it is also unfavorable since the heat resistance of the resin composition gradually lowers.

Singly or as combined, one or more of the long-chain monoalkylphenols may be used herein. Not interfering with the effect of the invention, the long-chain monoalkylphenol may be combined with any other alkylphenol of which the alkyl group has at most 9 carbon atoms.

As the case may be, the hydroxyl group of the diphenol may remain in the polycarbonate not completely terminated in the manner specifically defined herein, and the terminal fraction may be at least about 60%.

For the optional branching agent, for example, usable is a compound having at least three functional groups such as 1,1,1-tris(4-hydroxyphenyl)ethane, α,α'α''-tris(4-hydroxyphenyl)-1,3,5-triisopropylbenzene, 1-[α-methyl-α-(4'-hydroxyphenyl)ethyl]-4-[α',α'-bis(4''-hydroxyphenyl)ethyl] benzene, phloroglucine, trimellitic acid, isatin-bis(o-cresol).

The component (B) of the polycarbonate resin composition of the first aspect of the invention is an aromatic polycarbonate having a terminal group of formula (I-2). The aromatic polycarbonate is not specifically defined, and it may be readily produced by reacting a diphenol with phosgene or a carbonate compound.

Concretely, for example, it may be produced by reacting a diphenol with a carbonate precursor such as phosgene or by interesterifying a carbonate precursor such as diphenyl carbonate with a diphenol, in a solvent such as methylene chloride in the presence of a catalyst such as triethylamine and a terminal stopper.

The diphenol may be the same as or different from that mentioned hereinabove. The polycarbonate may be a homopolymer for which one and the same diphenol is used, or a copolymer for which two or more different types of diphenols are used. Further, it may also be a thermoplastic random-branched polycarbonate for which the diphenol is combined with a polyfunctional aromatic compound.

Examples of the dicarbonate compound are diaryl carbonates such as diphenyl carbonate, and dialkyl carbonates such as dimethyl carbonate or diethyl carbonate.

For the terminal stopper, used is a monophenol compound of the following general formula (I-4):

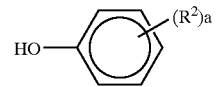

(I-4)

wherein R² and a have the same meanings as above. Preferably, it is a para-substituted monophenol. Concretely, it includes, for example, phenol, p-cresol, p-tert-butylphenol, p-tert-octylphenol, p-cumylphenol, p-nonylphenol, p-tert-amylphenol.

The polycarbonate resin to be in the polycarbonate resin composition of the invention comprises the components (A) and (B). Regarding their blend ratio, the amount of the component (A) is from 10 to 100% by weight, and that of the component (B) is from 0 to 90% by weight. If the amount of the component (A) is smaller than 10% by weight, it is unfavorable since the flowability of the resin composition of the invention is low and the moldings of the composition are not glossy.

The viscosity-average molecular weight (Mv) of the polycarbonate resin preferably falls between 10,000 and 40,000, more preferably between 12,000 and 30,000, even more preferably between 15,000 and 25,000. If the molecular weight of the resin is too low, the impact resistance of the resin moldings will be low; but if too high, the resin composition will be difficult to mold.

Various types of inorganic fillers are known for the component (C) to be added to the polycarbonate resin in the invention, and they are for increasing the mechanical strength and improving the dimensional stability of the polycarbonate resin composition or for increasing the amount of the resin composition.

The inorganic filler includes, for example, potassium titanate whiskers, mineral fibers (e.g., rock wool), glass fibers, carbon fibers, metal fibers (e.g., stainless steel fibers), aluminium borate whiskers, silicon nitride whiskers, boron fibers, tetrapod zinc oxide whiskers, talc, clay, mica, pearl mica, aluminium leaf, alumina, glass flakes, glass beads, glass balloons, carbon black, graphite, calcium carbonate, calcium sulfate, calcium silicate, titanium oxide, zinc oxide, silica, asbestos, and quarts powder. These inorganic fillers may be previously surface-treated or may not. The surface-treating agent includes, for example, silane coupling agents, higher fatty acids, metal salts of fatty acids, unsaturated organic acids, organic titanates, resin acids, and polyethylene glycols. With any of these, the inorganic fillers may be chemically or physically surface-treated.

Of the inorganic fillers mentioned above, preferred for use herein are glass fibers and carbon fibers.

For the glass fibers for use herein, any of alkali glass, low-alkali glass or non-alkali glass is preferred. The length of the glass fibers preferably falls between 0.1 and 8 mm, more preferably between 0.3 and 6 mm. Their diameter may fall between 0.1 and 30 $\mu$m, but preferably between 0.5 and 25 $\mu$m. The glass fibers are not specifically defined in point of their morphology, and they may be in any form of rovings, milled fibers or chopped fibers. Singly or as combined, one or more different types of such glass fibers may be used herein. Preferably, the glass fibers are treated with a surface-treating agent and then processed with a suitable sizing agent for enhancing the adhesiveness thereof to polycarbonate resin. The surface-treating agent includes, for example, silane coupling agents such as aminosilanes, epoxysilanes, vinylsilanes, acrylic silanes; titanate coupling agents, and aluminium, chromium, zirconium or boron-containing coupling agents. Of those, preferred for use herein are silane coupling agents and titanate coupling agents, and more preferred are silane coupling agents. For treating the glass fibers with such a surface-treating agent, the method is not specifically defined and may be any conventional one. For example, employable are an aqueous solution method, an organic solvent method and a spraying method. The sizing agent includes, for example, urethane compounds, acrylic compounds, acrylonitrile-styrene copolymers and epoxy compounds, any of which are usable herein. For processing the glass fibers with such a sizing agent, the method is not specifically defined and may be any conventional one. For example, employable is any method of dipping, roller-coating, blasting, casting or spraying.

The carbon fibers for use herein may be produced from cellulose fibers, acrylic fibers, lignin, or petroleum or coal-type special pitch generally by firing them. Various types of such carbon fibers are known, including, for example, flame-retardant, carbonaceous or graphitic ones. The length of the carbon fibers generally falls between 0.01 and 10 mm, and the diameter thereof may fall between 5 and 15 $\mu$m. The morphology of the carbon fibers is not specifically defined, including, for example, rovings, milled fibers and chopped strands. The carbon fibers may be surface-treated with epoxy resin or urethane resin for enhancing their affinity for polycarbonate resin.

The amount of the inorganic filler to be in the resin composition of the invention is from 5 to 150 parts by weight, but preferably from 10 to 80 parts by weight, relative to 100 parts by weight of the polycarbonate resin therein. If it is smaller than 5 parts by weight, the stiffness of the resin composition is low and the dimensional stability thereof is also low. If larger than 150 parts by weight, it is unfavorable since the resin composition is difficult or impossible to knead. Within the preferred range, the inorganic filler is effective for more enhancing the impact resistance of the resin moldings.

Not interfering with the object of the invention, the polycarbonate resin composition may contain from 100 to 5,000 ppm of a colorant, further optionally other additives and other synthetic resins or elastomers.

The additives are, for example, antioxidants such as hindered phenols, phosphorus-containing compounds (e.g., phosphites, phosphates), amines; UV absorbents such as benzotriazoles, benzophenones; optical stabilizers such as hindered amines; internal lubricants such as aliphatic carboxylates, paraffins, silicone oil, polyethylene wax; and mold release agents, flame retardants, flame retardation promoters, antistatic agents, colorants.

The additional synthetic resins are, for example, polyethylene resins, polypropylene resins, polystyrene resins, AS resins (acrylonitrile-styrene copolymers), ABS resins (acrylonitrile-butadiene-styrene copolymers), polymethyl methacrylate resins. The elastomers are, for example, isobutylene-isoprene rubber, styrene-butadiene rubber, ethylene-propylene rubber, acrylic elastomers.

The components mentioned above may be formulated and kneaded in any ordinary method. For it, example, usable are any of ribbon blenders, drum tumblers, Henschel mixers, Banbury mixers, single-screw extruders, double-screw extruders, cokneaders, and multi-screw extruders. While kneaded, they may be heated generally at 240 to 320° C.

The thus-obtained, colored polycarbonate resin composition may be molded in any known method. For example, it may be molded in any mode of injection molding, blow molding, extrusion molding, compression molding, calender molding or spin molding to give colored moldings such as parts of electric and electronic appliances, parts of electrically-powered tools and parts of cameras.

The first aspect of the invention is described more concretely with reference to its Production Examples, Examples and Comparative Examples, which, however, are not intended to restrict the scope of the first aspect of the invention.

[Preparation of Alkylphenol (a)]

Starting compounds, 300 parts by weight of phenol and 105 parts by weight of 1-eicosene/1-docosene/1-tetracosene (composition ratio, 53.3/40.2/6.5 by mol %) in a molar ratio of phenol/olefin=9/1, and 10.5 parts by weight of a catalyst, strong-acid polystyrenic sulfonate cation resin (Amberlyst 15 from Rohm and Haas) were put into a reactor equipped with a baffle and a stirring blade, and reacted at 120° C. with stirring for 3 hours. After the reaction, the mixture was purified through distillation under reduced pressure to obtain an alkylphenol (a). In the resulting alkylphenol (a), the alkyl group had 21 carbon atoms on average and was branched.

[Preparation of Alkylphenol (b)]

In the same manner as in preparing the alkylphenol (a), an alkylphenol (b) was prepared for which, however, the olefin used was 1-docosene, its amount was 110 parts by weight, the molar ratio of phenol/olefin was 9/1 and the amount of the catalyst used was 11 parts by weight. In the alkylphenol (b), the alkyl group had 22 carbon atoms and was branched.

[Production of Polycarbonate Oligomer]

60 kg of bisphenol A was dissolved in 400 liters of aqueous wt. % sodium hydroxide solution to prepare an aqueous solution of bisphenol A in sodium hydroxide.

Next, the aqueous solution of bisphenol A in sodium hydroxide kept at room temperature was fed into a tubular reactor having an inner diameter of 10 mm and a length of 10 m, at a flow rate of 138 liters/hr via an orifice plate of the reactor, along with methylene chloride thereinto via the plate at a flow rate of 69 liters/hr, while, at the same time, phosgene was also thereinto at a flow rate of 10.7 kg/hr, and they were continuously reacted for 3 hours. The tubular reactor used herein is a jacketed tube, in which cooling water was circulated through the jacket so as to keep the reaction mixture discharge at 25° C. The pH of the discharge was controlled to fall between 10 and 11.

The thus-obtained reaction mixture was kept static for phase separation. Its aqueous phase was removed, and its methylene chloride phase (220 liters) was collected to obtain a polycarbonate oligomer (concentration, 317 g/liter). The degree of polymerization of the polycarbonate oligomer fell between 2 and 4, and the chloroformate concentration thereof was 0.7 normalities.

[Production of Polycarbonate $A_1$]

10 liters of the polycarbonate oligomer obtained in the above was put into a 50-liter reactor equipped with a stirrer, and 136 g of p-dodecylphenol (from Yuka Schenectady, branched) was dissolved therein. Next, aqueous sodium hydroxide solution (sodium hydroxide 53 g, water 1 liter) and 5.8 ml of triethylamine were added thereto and reacted by stirring at 300 rpm for 1 hour. Then, the system was mixed with a solution of bisphenol A in sodium hydroxide (bisphenol A 720 g, sodium hydroxide 412 g, water 5.5 liters), 8 liters of methylene chloride was added thereto, and these were reacted by stirring at 500 rpm for 1 hour. After the reaction, 7 liters of methylene chloride and 5 liters of water were added to the system, and stirred at 500 rpm for 10 minutes. After stirring it was stopped, the system was kept static for phase separation into an organic phase and an aqueous phase. The resulting organic phase was washed with 5 liters of an alkali (0.03-N NaOH), 5 liters of an acid (0.2-N HCl) and 5 liters of water (twice) in that order. Next, methylene chloride was evaporated away to obtain a flaky polymer (polycarbonate $A_1$). The alkylphenoxy terminal fraction of the polymer was 99.5%, and the viscosity-average molecular weight thereof was 20,000.

[Production of Polycarbonate $A_2$]

In the same manner as in producing the polycarbonate $A_1$, a polycarbonate $A_2$ was produced, for which, however, 202 g of the alkylphenol (a) was used in place of p-dodecylphenol. The alkylphenoxy terminal fraction of the polymer was 99.0%, and the viscosity-average molecular weight thereof was 20,000.

[Production of Polycarbonate $A_3$]

In the same manner as in producing the polycarbonate $A_1$, a polycarbonate $A_3$ was produced, for which, however, 209 g of the alkylphenol (b) was used in place of p-dodecylphenol. The alkylphenoxy terminal fraction of the polymer was 99.0%, and the viscosity-average molecular weight thereof was 20,000.

[Production of Polycarbonate $B_1$]

In the same manner as in producing the polycarbonate $A_1$, a polycarbonate $B_1$ was produced, for which, however, 77.6 g of p-tert-butylphenol was used in place of p-dodecylphenol. The p-tert-butylphenoxy terminal fraction of the polymer was 99.5%, and the viscosity-average molecular weight thereof was 20,000.

The viscosity of the polycarbonate in methylene chloride at 20° C. was measured with an Ubbelohde's viscometer, and the intrinsic viscosity [η] thereof was derived from it. The viscosity-average molecular weight (Mv) of the polycarbonate was calculated according to the following equation:

$$[\eta]=1.23\times10^{-5} Mv^{0.83}.$$

EXAMPLES I-1 TO I-12, AND COMPARATIVE EXAMPLES I-1 to I-3

2,000 ppm of a colorant, carbon black (Mitsubishi Carbon Sharp 1000 from Mitsubishi Chemical) was added to the polycarbonate obtained in the above-mentioned Production Example, and glass fibers (MA-409C from Asahi Fiber Glass) were added thereto in different ratios as in Table I-1. This was kneaded in a vented double-screw extruder (TEM-35B from Toshiba Kikai) at 300° C., and pelletized through it. In Examples I-2, 3, 6, 7, 10, 11 and Comparative Examples I-2, 3, 200 ppm of an antioxidant (phosphorus-containing antioxidant PEP36 from Asahi Denka Kogyo) was added to the composition. In Examples I-2, 6, 10 and Comparative Example I-3, 2,000 ppm of a lubricant (SH200 from Toray Dow-Corning) was added to the composition.

According to the method mentioned below, the spiral flow length (SFL) of the pellets was measured. At a cylinder temperature of 300° C. and at a mold temperature of 80° C., the pellets were molded into test pieces, and their gloss and Izod impact strength were measured. The data are given in Table I-1. In the Table, "Example I-1" is simply designated as "Example 1", and the same shall apply to Comparative Examples.

(1) SFL:

The pellets are injection-molded to give a melt flow of 10 mm wide and 3 mm thick. The injection pressure is 80 kg/cm$^2$ (7.84 MPa), the resin temperature is 300° C., and the mold temperature is 80° C.

(2) Gloss:

The 60-degree mirror-face gloss of each test piece is measured according to JIS K 7105.

(3) Izod Impact Strength:

Measured according to JIS K 7110. Five samples of the same resin composition are tested in the same manner and their data are averaged.

TABLE I-1

| | Polycarbonate | | Glass Fibers | | | Izod Impact |
| --- | --- | --- | --- | --- | --- | --- |
| | A wt. % | B wt. % | amount (wt.pts.) | SFL cm | Gloss | Strength kJ/m$^2$ |
| Example 1 | $A_1$ (100) | 0 | 11 | 58 | 73 | 6 |
| Example 2 | $A_1$ (100) | 0 | 25 | 49 | 43 | 9 |
| Example 3 | $A_1$ (100) | 0 | 43 | 45 | 31 | 11 |
| Example 4 | $A_1$ (85) | 15 | 43 | 43 | 29 | 11 |
| Example 5 | $A_2$ (100) | 0 | 11 | 72 | 76 | 6 |
| Example 6 | $A_2$ (100) | 0 | 25 | 55 | 48 | 10 |
| Example 7 | $A_2$ (100) | 0 | 43 | 40 | 35 | 12 |
| Example 8 | $A_2$ (85) | 15 | 43 | 36 | 31 | 11 |
| Example 9 | $A_3$ (100) | 0 | 11 | 73 | 77 | 6 |
| Example 10 | $A_3$ (100) | 0 | 25 | 56 | 49 | 10 |
| Example 11 | $A_3$ (100) | 0 | 43 | 40 | 36 | 12 |
| Example 12 | $A_3$ (85) | 15 | 43 | 36 | 32 | 11 |
| Comp. Ex. 1 | 0 | 100 | 11 | 38 | 59 | 6 |
| Comp. Ex. 2 | 0 | 100 | 25 | 34 | 35 | 8 |
| Comp. Ex. 3 | 0 | 100 | 43 | 31 | 17 | 11 |

From Table I-1, it is understood that the flowability and the gloss of the samples of Examples are both better than those of the samples of Comparative Examples though the impact resistance of the former does not differ from that of the latter.

[II] Second Aspect of the Invention:

The polycarbonate resin composition of the second aspect of the invention (in this section, the "second aspect of the invention" will be simply referred to as "the invention") comprises 100 parts by weight of a polycarbonate-based resin (A) that contains a polycarbonate resin terminated with a phenoxy group having an alkyl group with from 21 to 35 carbon atoms, from 0.1 to 10 parts by weight of a functional group-having silicone compound (B), and from 0.2 to 10 parts by weight of a core/shell-type, grafted rubber-like elastomer (C).

The polycarbonate resin composition of the invention is characterized in that its constituent component (A) is a polycarbonate-based resin that contains a polycarbonate resin terminated with a phenoxy group having an alkyl group with from 21 to 35 carbon atoms (this will be hereinafter referred to as a terminal-modified PC).

The polycarbonate resin terminated with a phenoxy group having an alkyl group with from 21 to 35 carbon atoms can be obtained by using an alkylphenol having an alkyl group with from 21 to 35 carbon atoms as the terminal stopper in producing it. The alkylphenol is not specifically defined, including, for example, docosylphenol, tetracosylphenol, hexacosylphenol, octacosylphenol, triacontylphenol, dotriacontylphenol and tetratriacontylphenol. Singly or as combined, one or more of these phenols may be used herein. Not interfering with the effect of the invention, the alkylphenol may be combined with any other phenol such as an alkylphenol having at most 20 carbon atoms.

The alkyl group in the alkylphenol may be at any of o-, m- or p-position relative to the hydroxyl group therein, but is preferably at p-position. The alkyl group may be linear or branched.

In any of the polycarbonate-based resin mentioned below, the specific terminal-modified PC may be prepared, for example, through reaction of a diphenol with phosgene or a carbonate compound using the alkylphenol as the terminal stopper for controlling the molecular weight of the resulting polymer.

For example, it is prepared by reacting a diphenol with phosgene or a polycarbonate oligomer in a methylene chloride solvent in the presence of a triethylamine catalyst and a phenol having an alkyl group with from 21 to 35 carbon atoms. In this, the phenol having an alkyl group with from 21 to 35 carbon atoms terminates to modify one or both terminals of the polycarbonate resin. The terminal modification in the polycarbonate resin is at least 20%, preferably at least 50% of all the terminals of the resin. Accordingly, the other terminal not specifically modified in the polycarbonate resin is a hydroxyl terminal group or a group terminated with any other terminal stopper mentioned below.

The other terminal stoppers are phenols generally used in polycarbonate resin production, including, for example, phenol, p-tert-butylphenol, p-tert-octylphenol and p-cumylphenol. However, if such phenols only are used, it is impossible to obtain the resin composition of the invention having both good moldability and good impact resistance.

The viscosity-average molecular weight of the terminal-modified PC in the component (A) of the polycarbonate resin composition of the invention generally falls between 10,000 and 40,000, but preferably between 12,000 and 30,000.

The component (A) of the polycarbonate resin composition of the invention contains the specific terminal-modified PC, polycarbonate resin terminated with a phenoxy group having an alkyl group with from 21 to 35 carbon atoms. In this, the specific terminal-modified PC may be alone or may be combined with any other ordinary polycarbonate resin. The specific terminal-modified PC content of the component is not specifically defined, generally at least 20% by weight, but preferably at least 50% by weight, more preferably at least 70% by weight in consideration of all the terminals of the polycarbonate-based resin of the component (A) for better moldability (melt flowability) of the resin composition. The content may be suitably determined, depending on the ratio of the phenoxy group having an alkyl group with from 21 to 35 carbon atoms in the terminal-modified PC, the type of the other terminal of the modified PC, the type of the terminal of the other polycarbonate resin combined with the modified PC, and the melt flowability of the resin composition containing the modified PC.

The polycarbonate resins to constitute the component (A) of the polycarbonate resin composition of the invention are not specifically defined, including those known in the art. Generally used herein are aromatic polycarbonates to be produced from diphenols and carbonate precursors. For example, herein used are polycarbonates as produced by reacting a diphenol with a carbonate precursor in a solution method or in a melt method, such as those produced through reaction of a diphenol with phosgene or through interesterification of diphenyl carbonate with a diphenol.

Various diphenols are usable, typically including 2,2-bis (4-hydroxyphenyl)propane [bisphenol A], bis( 4-hydroxyphenyl)methane, 1,1-bis(4-hydroxyphenyl)ethane, 2,2-bis (4-hydroxy-3,5-dimethylphenyl)propane, 4,4'-dihydroxydiphenyl, bis(4-hydroxyphenyl)cycloalkanes, bis (4-hydroxyphenyl) oxide, bis(4-hydroxyphenyl) sulfide, bis (4-hydroxyphenyl) sulfone, bis(4-hydroxyphenyl) sulfoxide, bis(4-hydroxyphenyl) ether, and bis(4-hydroxyphenyl) ketone.

As the diphenols for use herein, preferred are bis(hydroxyphenyl)alkanes, especially those consisting essentially of bisphenol A. The carbonate precursors for use in the invention include, for example, carbonyl halides, carbonyl esters, and haloformates, concretely, phosgene, diphenol dihaloformates, diphenyl carbonate, dimethyl carbonate, and diethyl carbonate. Other diphenols such as hydroquinone, resorcinol, and catechol are also usable in the invention. The diphenols mentioned herein may be used either singly or as combined.

The polycarbonate resin may have a branched structure, for which the branching agent includes, for example, 1,1,1-tris(4-hydroxyphenyl)ethane, α,α',α"-tris( 4-hyroxyphenyl)-1,3,5-triisopropylbenzene, phloroglucine, trimellitic acid, and isatin-bis(o-cresol). For controlling the molecular weight of the polycarbonate resin, for example, employable are phenol, p-t-butylphenol, p-t-octylphenol, p-cumylphenol, and alkylphenols having an alkyl group with from 21 to 35 carbon atoms such as those mentioned above.

The polycarbonate resin composition of the invention is characterized in that it contains the terminal-modified PC which is terminated at least with the molecular weight-controlling agent, alkylphenol having an alkyl group with from 21 to 35 carbon atoms.

The polycarbonate resin and the terminal-modified PC for use in the invention may be polyester-polycarbonate copolymers to be produced through polymerization of polycarbonates in the presence of an ester precursor, such as a difunctional carboxylic acid (e.g., terephthalic acid, polymethylenedicarboxylic acid) or its ester-forming derivative, or may also be mixtures of different types of polycarbonate resins.

One typical example of other polycarbonate copolymers also usable herein is a polycarbonate-polyorganosiloxane copolymer (hereinafter abbreviated as PC-PDMS copolymer). The PC-PDMS copolymer comprises a polycarbonate moiety and a polyorganosiloxane moiety. For example, this may be prepared by dissolving a polycarbonate oligomer and a polyorganosiloxane having a reactive group at its terminal (this is to form the polyorganosiloxane moiety in the copolymer, and includes, for example, polydimethylsiloxane, polydiethylsiloxane, polymethylphenylsiloxane) in a solvent of, for example, methylene chloride, adding thereto an aqueous solution of bisphenol A containing sodium hydroxide, and reacting them in a mode of interfacial polycondensation in the presence of a catalyst of, for example, triethylamine. The PC-PDMS copolymer is disclosed in, for example, Japanese Patent Laid-Open Nos. 292359/1991, 202465/1992, 81620/1996, 302178/1996 and 7897/1998.

In the PC-PDMS copolymer, the degree of polymerization of the polycarbonate moiety preferably falls between 3 and 100 or so, and the degree of polymerization of the polydimethylsiloxane moiety preferably falls between 2 and 500 or so. The polydimethylsiloxane content of the PC-PDMS copolymer (including its by-product, bisphenol A polycarbonate) may generally fall between 0.2 and 30% by weight, but preferably between 0.3 and 20% by weight. The viscosity-average molecular weight of the polycarbonate resin and the polycarbonate copolymer such as PC-PDMS copolymer for use in the invention may fall generally between 10,000 and 100,000, but preferably between 11,000 and 40,000, more preferably between 12,000 and 30,000. The viscosity of the resin or the copolymer in methylene chloride at 20° C. is measured with an Ubbelohde's viscometer, and the intrinsic viscosity [η] thereof is derived from it. The viscosity-average molecular weight (Mv) of the resin or the copolymer is calculated according to the following equation:

$$[\eta]=1.23\times10^{-5} M v^{0.83}.$$

The component (A) of the polycarbonate resin composition of the invention may be a mixed resin of the above-mentioned, specific terminal-modified polycarbonate resin, PC-PDMS copolymer and bisphenol A polycarbonate. The polydimethylsiloxane content of the component (A) of this case is defined to fall between 0.1 and 10% by weight, preferably between 0.3 and 5% by weight of the mixed resin to be the polycarbonate-based resin for the component (A)

(B) Functional Group-Having Silicone Compound:

The functional group-having silicone compound for the component (B) of the polycarbonate resin composition of the second aspect of the invention is a functional group-having (poly)organosiloxane. Preferably, it is a polymer or copolymer having a basic structure of a formula:

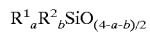

wherein $R^1$ represents a functional group, $R^2$ represents a hydrocarbon residue having from 1 to 12 carbon atoms, and $0<a\leq3$, $0\leq b<3$, and $0<a+b\leq3$. The functional group includes, for example, an alkoxy group, an aryloxy group, a polyoxyalkylene group, a hydride residue, a hydroxyl group, a carboxyl group, a silanol group, an amino group, a mercapto group, an epoxy group.

The silicone compound may have different functional groups; or silicone compounds each having a different functional group may be combined for the component (B). In the basic structure of the functional group-having silicone compound, the ratio of functional group ($R^1$)/hydrocarbon residue ($R^2$) generally falls between 0.1 and 3 or so, but preferably between 0.3 and 2 or so.

The silicone compound is liquid or powdery, but is preferably well dispersible in the other constituent components while they are kneaded in melt. One example of the compound is liquid and has a kinematic viscosity at room temperature of from 10 to 500,000 mm$^2$/sec or so. The polycarbonate resin composition of the invention is characterized in that the silicone compound uniformly disperses therein even when it is liquid, and bleeds little out of the composition being molded and out of the moldings of the composition.

The resin composition may contain from 0.1 to 10 parts by weight, preferably from 0.2 to 5 parts by weight of the functional group-having silicone compound, relative to 100 parts by weight of the polycarbonate-based resin (A) therein. If the amount of the silicone compound therein is smaller than 0.1 parts by weight, the resin composition could not be resistant to flames; but even if larger than 10 parts by weight, the silicone compound could no more augment its effect. In case where the polycarbonate-based resin in the resin composition contains PC-PDMS copolymer, the functional group-having silicone compound content of the resin composition may be suitably determined in consideration of the overall silicone content of the resin composition. In that case, since the resin composition contains some silicone in addition to the functional group-having silicone compound, the functional group-having silicone compound content of the resin composition may be reduced. Another advantage of the case is that the level of the flame retardancy of the resin composition is kept high even when the overall silicone content of the resin composition is lowered.

If non-functional silicone compounds with ordinary alkyl groups such as dimethylsilicone are used in place of the functional group-having silicone compound for the component (B), they are ineffective for improving the flame retardancy of the resin composition as in Comparative Examples mentioned below.

(C) Core/Shell-type, Grafted Rubber-like Elastomer:

For the component (C) of the polycarbonate resin composition of the invention, the core/shell-type, grafted rubber-like elastomer has a two-layered structure composed of a core and a shell, in which the core is of a flexible rubber material and the shell that covers the core is of a hard resin material. As a whole, the elastomer itself is powdery or granular. After blended with polycarbonate resin in melt, the core/shell-type, grafted rubber-like elastomer of that type mostly keeps its original powdery or granular condition. Since the grafted rubber-like elastomer mostly keeps its original powdery or granular condition after having been blended with the resin melt, it uniformly disperses in the resin composition and is effective for preventing the moldings of the resin composition from being troubled by surface layer peeling.

Known are various core/shell-type, grafted rubber-like elastomers that are usable herein. Commercially-available products of such elastomers include, for example, Hiblen B621 (from Nippon Zeon), KM-330 (from Rohm & Haas), Metablen W529, Metablen S2001, Metablen C223, Metablen B621 (all from Mitsubishi Rayon).

Above all, for example, preferred are those to be produced through polymerization of one or more vinylic monomers in the presence of a rubber-like polymer obtained from monomers of essentially alkyl acrylates or alkyl methacrylates with dimethylsiloxane. In the alkyl acrylates and acryl methacrylates, the alkyl group preferably has from 2 to 10 carbon atoms. Concretely, the acrylates and methacrylates include, for example, ethyl acrylate, butyl acrylate, 2-ethylhexyl acrylate, and n-octyl methacrylate. One example of the rubber-like polymers that are obtained from monomers of essentially those alkyl (meth)acrylates is a polymer to be prepared through reaction of at least 70% by weight of an alkyl acrylate with at most 30% by weight of any other copolymerizable vinylic monomer such as methyl methacrylate, acrylonitrile, vinyl acetate, styrene. To prepare the polymer, a polyfunctional monomer serving as a crosslinking agent, such as divinylbenzene, ethylene dimethacrylate, triallyl cyanurate or triallyl isocyanurate, may be suitably added to the polymerization system.

The vinylic monomers to be polymerized in the presence of such a rubber-like polymer include, for example, aromatic vinyl compounds such as styrene, α-methylstyrene; acrylates such as methyl acrylate, ethyl acrylate; and methacrylates such as methyl methacrylate, ethyl methacrylate. One or more these monomers may be (co)polymerized, as combined, or may be copolymerized with any other vinylic monomers such as vinyl cyanides (e.g., acrylonitrile, methacrylonitrile), and vinyl esters (e.g., vinyl acetate, vinyl propionate). The (co)polymerization may be effected in any known method of, for example, bulk polymerization, suspension polymerization, or emulsion polymerization. Especially preferred is emulsion polymerization.

It is desirable that the core/shell-type, grafted rubber-like elastomers thus produced in the manner mentioned above contain at least 20% by weight of the rubber-like polymer moiety. Typical examples of the core/shell-type, grafted rubber-like elastomers are MAS resin elastomers such as graft copolymers of styrene and methyl methacrylate with from 60 to 80% by weight of n-butyl acrylate. Other examples are composite rubber grafted copolymers to be prepared through graft copolymerization of a composite rubber with at least one vinylic monomer, in which the composite rubber comprises from 5 to 95% by weight of a polysiloxane rubber component and from 5 to 95% by weight of a polyacryl(meth)acrylate rubber component as so entangled that they are not separated from each other, and has a mean particle size of from 0.01 to 1 $\mu$m or so. The composite rubber grafted copolymers are better than single rubber grafted copolymers, as their effect of improving the impact resistance of resin moldings is higher than that of the latter, single rubber grafted copolymers. Commercial products of such composite rubber grafted copolymers are available, for example, Metablen S-2001 from Mitsubishi Rayon.

The amount of the component (C), core/shell-type, grafted rubber-like elastomer in the resin composition falls between 0.2 and 10 parts by weight, preferably between 0.5 and 5 parts by weight, relative to 100 parts by weight of the component (A), polycarbonate-based resin therein. If the grafted rubber-like elastomer content of the resin composition is smaller than 0.2 parts by weight, the impact resistance of the resin composition will be low; but if larger than 10 parts by weight, the flame retardancy, the heat resistance and the stiffness of the resin composition will be low. In general, 10 parts by weight of the elastomer is enough for the resin composition. Containing such a relatively small amount of the component (C), core/shell-type grafted rubber-like elastomer combined with a relatively small amount of the component (B), functional group-having silicone compound, the advantages of the polycarbonate resin composition of the invention are remarkable. If any other graft copolymer is used in place of the core/shell-type, grafted rubber-like elastomer therein, the impact strength of the resin composition could be improved in some degree but the flame retardancy thereof could not reach the desired level.

The three components of the polycarbonate resin composition of the invention well attain the object of the invention to improve the moldability (melt flowability), the impact resistance and the flame retardancy of the resin composition. If desired, however, any known melt drip inhibitor may be added to the resin composition for further improving the melt drip resistance of the composition in fire, for example, in combustion tests for flame retardancy of resin.

(D) Polyfluoro-olefin Resin:

Polyfluoro-olefin resin (D) is preferred for the melt drip inhibitor. The polyfluoro-olefin resin is a polymer or copolymer having an ordinary fluoroethylene structure. For example, it includes difluoroethylene polymer, tetrafluoroethylene polymer, tetrafluoroethylene-hexafluoropropylene copolymer, and copolymer of tetrafluoroethylene with an ethylenic monomer not containing fluorine. Preferred is polytetrafluoroethylene (PTFE), and its mean molecular weight is preferably at least 500,000, more preferably from 500,000 to 10,000,000. Any and every type of polytetrafluoroethylene known in the art is usable herein.

Polytetrafluoroethylene having the ability to form fibrils is more preferred, as it ensures higher melt drip inhibition. The fibril-forming polytetrafluoroethylene (PTFE) is not specifically defined, but preferred is PTFE of Type 3 stipulated in the ASTM Standard. Specific examples of PTFE of Type 3 include Teflon 6-J (from Mitsui-DuPont Fluorochemical), Polyflon D-1, Polyflon F-103, Polyflon F201 (from Daikin Industry), and CD076 (from Asahi ICI Fluoropolymers).

Others except PTFE of Type 3 are also employable herein, including, for example, Argoflon F5 (from Montefluos), Polyflon MPA and Polyflon FA-100 (from Daikin Industry). These polytetrafluoroethylenes (PTFE) may be used either singly or as combined. The fibril-forming polytetrafluoroethylene (PTFE) as above may be obtained, for example, by polymerizing tetrafluoroethylene in an aqueous solvent in the presence of sodium, potassium or ammonium peroxydisulfide, under a pressure falling between 0.01 and 1 MPa, at a temperature falling between 0 and 200° C., preferably between 20 and 100° C.

The amount of the polyfluoro-olefin resin that may be in the resin composition preferably falls between 0.02 and 5 parts by weight, more preferably between 0.05 and 2 parts by weight relative to 100 parts by weight of the component (A), polycarbonate-based resin therein. If the amount therein is smaller than 0.02 parts by weight, the melt drip-inhibiting ability of the composition will be not enough for the intended flame retardancy of the composition. However, even if its amount is larger than 5 parts by weight, the effect of the polyfluoro-olefin resin added could not be augmented any more, and such a large amount of the polyfluoro-olefin resin, if added to the composition, will have some negative influences on the impact resistance and the outward appearance of the moldings of the composition. Therefore, the amount of the polyfluoro-olefin resin to be added to the composition may be suitably determined, depending on the necessary flame retardancy of the moldings of the composition, for example, based on V-0, V-1 or V-2 in UL-94, and depending on the amount of the other constituent components of the composition.

The polycarbonate resin composition of the invention may contain, if desired, an inorganic filler which is for enhancing the stiffness of the resin moldings and for further enhancing the flame retardancy thereof. The inorganic filler includes, for example, talc, mica, kaolin, diatomaceous earth, calcium carbonate, calcium sulfate, barium sulfate, glass fibers, carbon fibers, and potassium titanate fibers. Especially preferred for use herein are tabular fillers of, for example, talc and mica, and fibrous fillers such as glass fibers and carbon fibers. Talc is a magnesium silicate hydrate, and this is available on the market. The inorganic filler such as talc for use herein may have a mean particle size of from 0.1 to 50 μm, but preferably from 0.2 to 20 μm. The inorganic filler, especially talc in the resin composition is effective for further enhancing the stiffness of the moldings of the composition, and, as the case may be, it will be able to reduce the amount of the silicone compound to be in the composition.

The amount of the inorganic filler content that may be in the resin composition preferably falls between 1 and 100 parts by weight, more preferably between 2 and 50 parts by weight relative to 100 parts by weight of the component (A), polycarbonate-based resin therein. If its amount is smaller than 1 part by weight, the inorganic filler added could not satisfactorily exhibit its effect of enhancing the stiffness and the flame retardancy of the resin composition; but if larger than 100 parts by weight, the impact resistance and the melt flowability of the resin composition will lower. The amount of the inorganic filler to be in the resin composition may be suitably determined, depending on the necessary properties of the resin moldings and the moldability of the composition, especially on the thickness of the moldings and the spiral flow length of the composition.

The second aspect of the invention also provides a polycarbonate resin composition, which comprises 100 parts by weight of a resin mixture of from 1 to 99% by weight of a polycarbonate-based resin (A) that contains a polycarbonate resin terminated with a phenoxy group having an alkyl group with from 21 to 35 carbon atoms, and from 1 to 99% by weight of a styrenic resin (E), and from 0.01 to 5 parts by weight of a polyfluoro-olefin resin (D).

The polycarbonate resin composition of the second aspect of the invention is characterized in that its constituent component (A), polycarbonate-based resin contains a polycarbonate resin terminated with a phenoxy group having an alkyl group with from 21 to 35 carbon atoms (this will be hereinafter referred to as a terminal-modified PC). In this, the terminal-modified PC may be the same as that mentioned hereinabove to be in the component (A).

(E) Styrenic Resin:

For the styrenic resin for the constituent component (E) of the polycarbonate resin composition of the second aspect of the invention, usable are polymers that are prepared through polymerization of a monomer or monomer mixture of from 20 to 100% by weight of a monovinylic aromatic monomer such as styrene or α-methylstyrene, from 0 to 60% by weight of a vinyl cyanide-type monomer such as acrylonitrile or methacrylonitrile, and from 0 to 50% by weight of any other vinylic monomer copolymerizable with those monomers, such as maleimide or methyl (meth)acrylate. The polymers include, for example, polystyrenes (GPPS), acrylonitrile-styrene copolymers (AS resins).

For the styrenic resin, also preferably used herein are rubber-modified styrenic resins. The rubber-modified styrenic resins are preferably high-impact styrenic resins that are produced through grafting polymerization of rubber with at least styrenic monomers. The rubber-modified styrenic resins include, for example, high-impact polystyrenes (HIPS) produced through polymerization of rubber such as polybutadiene with styrene; ABS resins produced through polymerization of polybutadiene with acrylonitrile and styrene; MBS resins produced through polymerization of polybutadiene with methyl methacrylate and styrene. These rubber-modified styrenic resins may be combined, or may be mixed with other styrenic resins not modified with rubber such as those mentioned above, and the resin mixtures may be used in the invention.

In the rubber-modified styrenic resins, the amount of rubber to modify them may fall, for example, between 2 and 50% by weight, but preferably between 5 and 30% by weight, more preferably between 5 and 15% by weight. If the rubber content is smaller than 2% by weight, the impact resistance of the resin moldings will be poor. If, on the other hand, it is larger than 50% by weight, the thermal stability of the resin composition will be lowered, and the melt flowability thereof will be also lowered. If so, in addition, the resin composition will be unfavorably gelled or yellowed.

Specific examples of rubber for use herein include polybutadiene, acrylate and/or methacrylate-having rubber-like polymers, styrene-butadiene-styrene rubber (SBS), styrene-butadiene rubber (SBR), butadiene-acrylic rubber, isoprene rubber, isoprene-styrene rubber, isoprene-acrylic rubber, and ethylene-propylene rubber. Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds), and even their mixtures.

Containing the resin mixture of polycarbonate resin and styrenic resin, the melt flowability of the polycarbonate resin composition of the invention is high. The blend ratio of the two resins to give the resin mixture is as follows: The amount of the component (A), polycarbonate-based resin is from 1 to 99% by weight, preferably from 50 to 98% by weight, more preferably from 70 to 95% by weight; and that of the styrenic resin (E) is from 1 to 99% by weight, preferably from 2 to 50% by weight, more preferably from 5 to 30% by weight. If the amount of the component (A), polycarbonate-based resin is smaller than 1% by weight, the heat resistance and the strength of the resin moldings will be low; and if the amount of the component (E), styrenic resin is smaller than 1% by weight, the moldability of the resin composition will be poor. For the styrenic resin (E), preferred are rubber-modified styrenic resins such as those mentioned hereinabove. In case where the rubber-modified polystyrene resin is used for the component (E), the blend ratio of the two resins is preferably as follows: The amount of the component (A), polycarbonate-based resin is from 70 to 98% by weight, and that of the rubber-modified polystyrene resin (E) is from 2 to 30% by weight.

The resin blend ratio may be suitably determined, depending on the terminal-modified polycarbonate resin, the molecular weight of other polycarbonate resin, the type of styrenic resin, the melt flow rate of the resin composition, the rubber content of the resin composition, and on the use of the resin moldings, especially the size and the thickness thereof.

(D) Polyfluoro-olefin Resin:

This may be the same as that for the component (D) mentioned hereinabove.

The amount of the polyfluoro-olefin resin in the resin composition is from 0.01 to 5 parts by weight, preferably from 0.05 to 2 parts by weight relative to 100 parts by weight of the resin mixture of the components (A) and (E) therein.

If the amount of the polyfluoro-olefin resin therein is smaller than 0.01 parts by weight, the melt drip-inhibiting ability of the composition will be not enough for the intended flame retardancy of the composition. However, even if its amount is larger than 5 parts by weight, the effect of the polyfluoro-olefin resin added could not be augmented any more. Therefore, the amount of the polyfluoro-olefin resin to be added to the composition may be suitably determined, depending on the necessary flame retardancy of the moldings of the composition, for example, based on V-0, V-1 or V-2 in UL-94, and depending on the amount of the other constituent components of the composition.

(B) Functional Group-having Silicone Compound:

For further enhancing its flame retardancy, the resin composition preferably contains a functional group-having silicone compound, which may be the same as that mentioned hereinabove for the component (B).

The amount of the functional group-having silicone compound that may be in the resin composition is preferably from 0.1 to 10 parts by weight, more preferably from 0.2 to 5 parts by weight relative to 100 parts by weight of the resin mixture of the components (A) and (E) therein. If the amount of the silicone compound therein is smaller than 0.1 parts by weight, the resin composition could not be resistant to flames; but even if larger than 10 parts by weight, the silicone compound could no more augment its effect. In case where the polycarbonate-based resin in the resin composition contains PC-PDMS copolymer, the functional group-having silicone compound content of the resin composition may be suitably determined in consideration of the overall silicone content of the resin composition. In that case, since the resin composition contains some silicone in addition to the functional group-having silicone compound, the functional group-having silicone compound content of the resin composition may be reduced. Another advantage of the case is that the level of the flame retardancy of the resin composition is kept high even when the overall silicone content of the resin composition is lowered.

(F) Inorganic Filler:

The polycarbonate resin composition of the second aspect of the invention may contain an inorganic filler for enhancing the stiffness of the resin moldings. The inorganic filler may be the same as that mentioned hereinabove.

The amount of the inorganic filler that may be in the resin composition is preferably from 1 to 100 parts by weight, more preferably from 2 to 50 parts by weight relative to 100 parts by weight of the resin mixture of the components (A) and (E) therein. If its amount is smaller than 1 part by weight, the inorganic filler added could not satisfactorily exhibit its effect of enhancing the stiffness and the flame retardancy of the resin composition; but if larger than 100 parts by weight, the impact resistance and the melt flowability of the resin composition will lower. The amount of the inorganic filler to be in the resin composition may be suitably determined, depending on the necessary properties of the resin moldings and the moldability of the composition, especially on the thickness of the moldings and the spiral flow length of the composition.

In addition to the indispensable components (A), (B) and (C) and the optional components (D) and inorganic filler, or in addition to the indispensable components (A), (E) and (D) and the optional components (B) and (F), the polycarbonate resin composition of the invention may contain any other additives which are generally added to ordinary thermoplastic resins such as polyester resins and polyamide resins, if desired. The additives are for further improving the moldability of the composition and for further improving the impact resistance, the outward appearances, the weather resistance and the stiffness of the moldings of the composition. They include, for example, phenolic, phosphorus-containing or sulfur-containing antioxidants, antistatic agents, polyamide-polyether block copolymers (for permanent static electrification resistance), benzotriazole-type or benzophenone-type UV absorbents, hindered amine-type light stabilizers (weather-proofing agents), plasticizers, microbicides, compatibilizers, and colorants (dyes, pigments). The amount of the optional additives that may be in the polycarbonate resin composition of the invention is preferably so defined that they do not interfere with the properties of the composition.

Methods for producing the polycarbonate resin composition of the invention are described. The resin composition may be produced by mixing and kneading the indispensable components and the optional components in a predetermined ratio as above. Formulating and mixing the constituent components into the intended resin composition may be effected in any known manner, for example, by premixing them in an ordinary device, such as a ribbon blender or a drum tumbler, followed by further kneading the resulting pre-mix in a Banbury mixer, a single-screw extruder, a double-screw extruder, a multi-screw extruder or a cokneader. The temperature at which the components are mixed and kneaded generally falls between 240 and 300° C. For molding the melt mixture, preferably used is an extrusion molding machine, more preferably a vented extruder. Other constituent components than polycarbonate resin may be previously mixed with polycarbonate resin or with any other thermoplastic resin to prepare a master batch.

Having been prepared in the manner as above, the polycarbonate resin composition of the invention may be molded into various moldings in the melt-molding devices as above, or, after it is pelletized, the resulting pellets may be molded into various moldings through injection molding, injection compression molding, extrusion molding, blow molding, pressing, vacuum forming or foaming. Especially preferably, the composition is pelletized in the melt-kneading manner as above, and the resulting pellets are molded into moldings through injection molding or injection compression molding. For injection molding of the composition, employable is a gas-assisted molding method which is effective for preventing the moldings from having sinking marks on their surfaces and for reducing the weight of the moldings.

Moldings of the polycarbonate resin composition of the invention are usable for various housings and parts of electric and electronic appliances, such as copiers, facsimiles, televisions, radios, tape recorders, video decks, personal computers, printers, telephones, information terminals, refrigerators, and microwave ovens. The moldings have still other applications, and are usable, for example, as automobile parts.

The second aspect of the invention is described more concretely with reference to its Production Examples, Examples and Comparative Examples, which, however, are not intended to restrict the scope of the invention.

[Preparation of Alkylphenol]

Starting compounds, 300 parts by weight of phenol and 110 parts by weight of 1-docosene in a molar ratio of phenol/olefin=9/1, and 11 parts by weight of a catalyst, strong-acid polystyrenic sulfonate cation resin (Amberlyst 15 from Rohm and Haas) were put into a reactor equipped with a baffle and a stirring blade, and reacted at 120° C. with stirring for 3 hours. After the reaction, the mixture was purified through distillation under reduced pressure to obtain an alkylphenol (a). In the resulting alkylphenol (a), the alkyl group had 22 carbon atoms.

[Production of PC Oligomer]

60 kg of bisphenol A was dissolved in 400 liters of aqueous 5 wt. % sodium hydroxide solution to prepare an aqueous solution of bisphenol A in sodium hydroxide.

Next, the aqueous solution of bisphenol A in sodium hydroxide kept at room temperature was fed into a tubular reactor having an inner diameter of 10 mm and a length of 10 m, at a flow rate of 138 liters/hr via an orifice plate of the reactor, along with methylene chloride thereinto via the plate at a flow rate of 69 liters/hr, while, at the same time, phosgene was also thereinto at a flow rate of 10.7 kg/hr, and they were continuously reacted for 3 hours. The tubular reactor used herein is a jacketed tube, in which cooling water was circulated through the jacket so as to keep the reaction mixture discharge at 25° C. The pH of the discharge was controlled to fall between 10 and 11.

The thus-obtained reaction mixture was kept static for phase separation. Its aqueous phase was removed, and its methylene chloride phase (220 liters) was collected to obtain a PC oligomer (concentration, 317 g/liter). The degree of polymerization of the PC oligomer fell between 2 and 4, and the chloroformate concentration thereof was 0.7 normalities.

[Production of Terminal-modified Polycarbonate]

10 liters of the PC oligomer obtained in above Production Example was put into a 50-liter reactor equipped with a stirrer, and 247 g of the alkylphenol (a) was dissolved therein. Next, aqueous sodium hydroxide solution (sodium hydroxide 53 g, water 1 liter) and 5.8 cc of triethylamine were added thereto and reacted by stirring at 300 rpm for 1 hour. Then, the system was mixed with a solution of bisphenol A in sodium hydroxide (bisphenol A 720 g, sodium hydroxide 412 g, water 5.5 liters), 8 liters of methylene chloride was added thereto, and these were reacted by stirring at 500 rpm for 1 hour. After the reaction, 7 liters of methylene chloride and 5 liters of water were added to the system, and stirred at 500 rpm for 10 minutes. After stirring was stopped, the system was kept static for phase separation into an organic phase and an aqueous phase. The resulting organic phase was washed with 5 liters of an alkali (0.03-N NaOH), 5 liters of an acid (0.2-N HCl) and 5 liters of water (twice) in that order. Next, methylene chloride was evaporated away to obtain a flaky polymer. Its viscosity-average molecular weight was 17,500.

[Production of Reactive PDMS]

1483 g of octamethylcyclotetrasiloxane, 96 g of 1,1,3,3-tetramethyldisiloxane and 35 g of 86% sulfuric acid were mixed and stirred at room temperature for 17 hours. The resulting oily phase was separated, and 25 g of sodium hydrogencarbonate was added thereto and stirred for 1 hour. After filtered, this was distilled in vacuum of 3 Torr ($4 \times 10^2$ Pa) at 150° C. to remove the low-boiling fraction, and the residual oil was collected.

To a mixture of 60 g of 2-allylphenol and 0.0014 g of a platinum compound, platinum chloride-alcoholate complex, added was 294 g of the oil at 90° c. While kept at 90 to 115° C., the resulting mixture was stirred for 3 hours. The resulting product was extracted with methylene chloride and washed three times with aqueous 80% methanol to remove the excess 2-allylphenol. This was dried with anhydrous sodium sulfate and then heated in vacuum at 115° C. to remove the solvent.

Through its NMR, the thus-obtained, phenol-terminated PDMS was found to have 30 repetitive dimethylsilanoxy units.

[Production of PC-PDMS Copolymer]

182 g of the reactive PDMS obtained in the above was dissolved in 2 liters of methylene chloride, and this was mixed with 10 liters of the PC oligomer obtained in above Production Example. To this were added a solution of 26 g of sodium hydroxide in 1 liter of water and 5.7 cc of triethylamine, and these were reacted by stirring at 500 rpm at room temperature for 1 hour.

To the resulting reaction system, added were a solution of 600 g of bisphenol A dissolved in 5 liters of aqueous 5.2 wt. % sodium hydroxide, 8 liters of methylene chloride, and 96 g of p-tert-butylphenol, and these were reacted by stirring at 500 rpm at room temperature for 2 hours.

5 liters of methylene chloride was added to the resulting reaction system, which was then washed with 5 liters of water, 5 liters of an alkali, 0.03-N sodium hydroxide, 5 liters of an acid, 0.2-N hydrochloric acid, and 5 liters of water (two times) in that order. Finally, methylene chloride was removed from this, and a flaky PC-PDMS copolymer was obtained. This was dried in vacuum at 120° C. for 24 hours. Its viscosity-average molecular weight was 17,000, and its PDMS content was 4.0% by weight.

The viscosity-average molecular weight and the PDMS content were measured as follows:

(1) Viscosity-average Molecular Weight (Mv):

The viscosity of the copolymer in methylene chloride at 20° C. was measured with an Ubbelohde's viscometer, and the intrinsic viscosity [η] thereof was derived from it. The viscosity-average molecular weight (Mv) of the copolymer was calculated according to the following equation:

$$[\eta]=1.23 \times 10^{-5} Mv^{0.83}.$$

(2) PDMS Content:

Based on the intensity ratio of the methyl peak of the isopropyl group of bisphenol A seen at 1.7 ppm in $^1$H-NMR of the copolymer to the methyl peak of the dimethylsiloxane moiety seen at 0.2 ppm therein, the PDMS content of the copolymer was obtained.

[Production of Terminal-modified PC-PDMS Copolymer]

A terminal-modified PC-PDMS copolymer was produced in the same manner as in producing the PC-PDMS copolymer, for which, however, 257 g of the alkylphenol (a) was used in place of 96 g of p-tert-butylphenol. The thus-obtained, terminal-modified PC-PDMS copolymer was dried in vacuum at 120° C. for 24 hours. Its viscosity-average molecular weight was 17,000, and its PDMS content was 4.0% by weight.

EXAMPLES II-1 TO II-4, AND COMPARATIVE EXAMPLES II-1 TO II-7

The components shown in Table II-1 were blended in different ratios as therein [the amount of the component (A) is in terms of % by weight, and that of the other components is in terms of parts by weight relative to 100 parts by weight of the component (A)], fed into a vented double-screw extruder (TEM35 from Toshiba Kikai), melted and kneaded therein at 280° C., and then pelletized. To all compositions of Examples and Comparative Examples, added were 0.2 parts by weight of Irganox 1076 (from Ciba Specialty Chemicals) and 0.1 parts by weight of Adekastab C (from Asahi Denka Industry) both serving as an antioxidant. The resulting pellets were dried at 120° C. for 12 hours, and then molded into test pieces in a mode of injection molding at 270° C. The mold temperature was 80° C. These test pieces were tested for their properties in various test methods, and their data obtained are given in Table II-1. In the Table, "Example II-1" is simply designated as "Example 1", and the same shall apply to Comparative Examples.

The materials used for producing the test samples, and the methods for testing the samples are mentioned below.

(A) Polycarbonate Resin:
PC-1: Toughlon A1700 (from Idemitsu Petrochemical).
 This is a bisphenol A polycarbonate resin having a melt flow rate (MFR) of 27 g/10 min (measured at 300° C. under a load of 11.77 N according to JIS K 7210) and a viscosity-average molecular weight of 17,000, and terminated with p-tert-butylphenoxy group.
PC-2: Toughlon A1500 (from Idemitsu Petrochemical).
 This is a bisphenol A polycarbonate resin having an MFR of 50 g/10 min and a viscosity-average molecular weight of 15,000, and terminated with p-tert-butylphenoxy group.
Terminal-modified PC:
 This is the p-docosylphenoxy-terminated polycarbonate resin obtained in the above.
PC-PDMS:
 This is the bisphenol A-polydimethylsiloxane (PDMS) copolymer obtained in the above, having a PDMS content of 4.0% by weight and a viscosity-average molecular weight of 17,000, and terminated with p-tert-butylphenoxy group.

(B) Silicone Compound:
Silicone-1: KR219 (from Shin-etsu Chemical Industry).
 This is methylphenylsilicone with vinyl and methoxy groups, having a kinematic viscosity of 18 mm$^2$/sec.
Silicone-3: SH200 (from Toray Dow-Corning).
 This is dimethylsilicone having a kinematic viscosity of (C) Core/shell-type, Grafted Rubber-like Elastomer:
Rubber-Like Elastomer-1: Metablen S2001 (from Mitsubishi Rayon).
 This is a composite rubber-like graft copolymer having a polydimethylsiloxane content of at least 50% by weight.

Rubber-Like Elastomer-2: VECTOR 8550-5 (from Dexco Polymers).
 This is an SBS-type graft copolymer (for comparison).

(D) Polyfluoro-olefin Resin:
 PTFE: CD076 (from Asahi ICI Fluoropolymers).

[Test Methods]

(1) Melt Flowability:
 MFR (melt flow rate) of each sample is measured at 300° C. under a load of 11.77 N, according to JIS K 7210.

(2) IZOD Impact Strength:
 Measured according to ASTM D256 at 23° C. The samples are 3.2 mm thick.

(3) Flame Retardancy:
 Tested according to the combustion test of UL94. V-2NG indicates that the samples tested do not correspond to any of V-0, V-1 and V-2.

(4) Grease Resistance:
 Measured according to a chemical resistance test method (for measuring the critical deflection of a test sample on a quarter oval tool).

on a quarter oval tool).
 Concretely, a test sample (having a thickness of 3 mm) is fixed on a quarter oval tool as in FIG. II-1 (showing a perspective view of the tool), Albanian grease (from Showa Shell Petroleum) is applied thereto, and this is kept as such for 48 hours. The shortest length (X) of the tool on which the sample has been cracked is read, and the critical deflection (%) of the sample is obtained according to the following equation (II-1).

$$\text{Critical Deflection (\%)} = b/2a^2 \times [1-(1/a^2-b^2/a^4)X^2]^{-3/2} \cdot t \times 100 \qquad \text{(II-1)},$$

in which t indicates the thickness of the test sample.

(5) Recyclability:
 Resin composition pellets are molded in a mode of injection molding at 300° C. into housings for notebook-size personal computers (of A4 size). The mold temperature is 80° C. The housings are ground, and 100% recycled into test pieces molded in the same manner as previously.

The IZOD impact strength of the recycled test pieces is measured.

The color change of the recycled test pieces is measured. Concretely, the color (L, a, b) of the original test pieces and that of the recycled test pieces are measured with a calorimeter, according to JIS H 7103 (test method for yellowing). From the data, obtained is the color difference, ΔE between the original test pieces and the recycled test pieces.

TABLE II-1-(1)

|  |  |  | Example 1 | Example 2 | Example 3 | Example 4 | Co. Ex. 1 | Co. Ex. 2 |
|---|---|---|---|---|---|---|---|---|
| Composition | (A) | PC-1: A1700 |  |  |  | 25 | 100 |  |
|  |  | PC-2: A1500 |  |  |  |  |  | 100 |
|  |  | Terminal-modified PC | 100 | 100 | 75 | 50 |  |  |
|  |  | PC-PDMS |  |  | 25 | 25 |  |  |
|  |  | PDMS content of resin (A) (wt. %) | 0 | 0 | 1.0 | 1.0 | 0 | 0 |
|  | (B) | Silicone-1 | 3 | 3 | 1 | 1 | 3 |  |
|  |  | Silicone-3 (for comparison) |  |  |  |  |  |  |
|  | (C) | Rubber-like elastomer-1 | 1 | 1 | 2 | 2 | 1 | 1 |
|  |  | Rubber-like elastomer-2 (for comparison) |  |  |  |  |  |  |
|  | (D) | PTFE |  | 0.5 | 0.3 | 0.3 |  | 0.5 |

TABLE II-1-(1)-continued

|  |  |  | Example 1 | Example 2 | Example 3 | Example 4 | Co. Ex. 1 | Co. Ex. 2 |
|---|---|---|---|---|---|---|---|---|
| Evaluation | (1) Melt flowability: MFR (g/10 min) | | 45 | 45 | 47 | 44 | 28 | 43 |
| | (2) IZOD impact strength (kJ/m$^2$) | | 60 | 60 | 55 | 65 | 65 | 60 |
| | (3) Flame retardancy 94 UL-94 | test piece 1.5 mm thick | V-2 | V-0 | V-0 | V-0 | V-2NG | V-2NG |
| | | test piece 2.5 mm thick | V-2 | V-0 | V-0 | V-0 | V-2 | V-2NG |
| | (4) Grease resistance | | 1.0 | 1.0 | 0.9 | 0.8 | 0.8 | 1.0 |
| | (5) Recyclability | IZOD impact strength (kJ/m$^2$) | 60 | 60 | 50 | 60 | 60 | 60 |
| | | color change (ΔE) | 1.3 | 1.4 | 1.2 | 1.4 | 1.5 | 1.3 |

TABLE II-1-(2)

|  |  |  | Co. Ex. 3 | Co. Ex. 4 | Co. Ex. 5 | Co. Ex. 6 | Co. Ex. 7 |
|---|---|---|---|---|---|---|---|
| Composition | (A) | PC-1: A1700 | | | 50 | 100 | |
| | | PC-2: A1500 | | | 50 | | |
| | | Terminal-modified PC | 100 | | | 75 | 75 |
| | | PC-PDMS | | | | 25 | 25 |
| | | PDMS content of resin (A) (wt. %) | 0 | 0 | 0 | 1.0 | 1.0 |
| | (B) | Silicone-1 | 3 | 3 | 3 | 1 | |
| | | Silicone-3 (for comparison) | | | | | 1 |
| | (C) | Rubber-like elastomer-1 | | 1 | 1 | | 2 |
| | | Rubber-like elastomer-2 (for comparison) | | | | 2 | |
| | (D) | PTFE | 0.5 | 0.5 | 0.5 | 0.3 | 0.3 |
| Evaluation | (1) Melt flowability: MFR (g/10 min) | | 45 | 36 | 28 | 46 | 46 |
| | (2) IZOD impact strength (kJ/m$^2$) | | 15 | 20 | 65 | 55 | 60 |
| | (3) Flame retardancy 94 UL-94 | test piece 1.5 mm thick | V-0 | V-0 | V-0 | V-2NG | V-2NG |
| | | test piece 2.5 mm thick | V-0 | V-0 | V-0 | V-2NG | V-2NG |
| | (4) Grease resistance | | 0.8 | 0.4 | 0.8 | 0.7 | 0.7 |
| | (5) Recyclability | IZOD impact strength (kJ/m$^2$) | 10 | 10 | 65 | 40 | 55 |
| | | color change (ΔE) | 1.4 | 1.2 | 1.2 | 3.5 | 1.4 |

EXAMPLES II-5 TO II-11, AND COMPARATIVE EXAMPLES II-8 TO II-13

The components shown in Table II-2 were blended in different ratios as therein [the amount of the component (A) and the component (E) is in terms of % by weight, and that of the other components is in terms of parts by weight relative to 100 parts by weight of the resin mixture of the components (A) and (E)], fed into a vented double-screw extruder (TEM35 from Toshiba Kikai), melted and kneaded therein at 280° C., and then pelletized. To all compositions of Examples and Comparative Examples, added were 0.2 parts by weight of Irganox 1076 (from Ciba Specialty Chemicals) and 0.1 parts by weight of Adekastab C (from Asahi Denka Industry) both serving as an antioxidant. The resulting pellets were dried at 120° C. for 12 hours, and then molded into test pieces in a mode of injection molding at 270° C. The mold temperature was 80° C. These test pieces were tested for their properties in various test methods, and their data obtained are given in Table II-2. In the Table, "Example II-5" is simply designated as "Example 5", and the same shall apply to Comparative Examples.

The materials used for producing the test samples, and the methods for testing the samples are mentioned below.

(A) Polycarbonate Resin:
PC-2: Same as above.
PC-3: Toughlon A1900 (from Idemitsu Petrochemical).
  This is a bisphenol A polycarbonate resin having an MFR of 19 g/10 min (measured at 300° C. under a load of 11.77 N according to JIS K 7210) and a viscosity-average molecular weight of 19,000, and terminated with p-tert-butylphenoxy group.

Terminal-modified PC: Same as above.
PC-PDMS: Same as above.

Terminal-modified PC-PDMS:
  This is the bisphenol A-polydimethylsiloxane (PDMS) copolymer obtained in the above, having a PDMS content of 4.0% by weight and a viscosity-average molecular weight of 17,100, and terminated with p-docosylphenoxy group.

(E) Styrenic Resin:
HIPS (High-impact Polystyrene): IDEMITSU PS IT44 (from Idemitsu Petrochemical).
  This is a polybutadiene-styrene graft copolymer, having a rubber content of 10% by weight and MFR of 8 g/10 min (measured at 200° C. under a load of 49.03 N according to JIS K 7210).
ABS (Acrylonitrile-butadiene-styrene Copolymer): DP-611 (from Technopolymer), Having MFR of 2 g/10 min.

(D) Polyfluoro-Olefin Resin:
PTFE: Same as above.
(B) Silicone Compound:
Silicone-1: Same as above.

Silicone-2: KC-89 (from Shin-etsu Chemical Industry).

This is methoxy group-having dimethylsilicone, having a kinematic viscosity of 20 mm²/sec.

(F) Inorganic Filler:
Talc: FFR (from Asada Milling), having a mean particle size of 0.7 μm.

The test methods are the same as those mentioned hereinabove.

is an aromatic polycarbonate-polyorganosiloxane copolymer having a terminal group of formula (III-1) mentioned above (this is hereinafter abbreviated as PC-PDMS copolymer). For example, it includes copolymers disclosed in Japanese Patent Laid-Open Nos. 29695/1975, 292359/1991, 202465/1992, 81620/1996, 302178/1996 and 7897/1998. For it, preferred are copolymers having an aromatic poly-

TABLE II-2-(1)

| | | | Ex. 5 | Ex. 6 | Ex. 7 | Ex. 8 | Ex. 9 | Ex. 10 | Ex. 11 |
|---|---|---|---|---|---|---|---|---|---|
| Composition | (A) | PC-1: A1500 | | | | | | | |
| | | PC-3: A1900 | | | | | | | |
| | | Terminal-modified PC | 90 | 90 | 80 | 65 | 90 | 10 | 50 |
| | | PC-PDMS | | | | 25 | | 80 | |
| | | Terminal-modified PC-PDMS | | | | | | | 40 |
| | | PDMS content of resin (A) (wt. %) | 0 | 0 | 0 | 1.0 | 0 | 3.2 | 1.6 |
| | (E) | HIPS | 10 | 10 | | 10 | 10 | 10 | 10 |
| | | ABS | | | 20 | | | | |
| | (D) | PTFE | 0.5 | 0.5 | 0.3 | 0.5 | 0.5 | 0.5 | 0.5 |
| | (B) | Silicone-1 | | 4 | 4 | | 4 | | |
| | | Silicone-2 | | | | 2 | | | |
| | (F) | Talc | | | | | | 10 | 50 | 10 |
| Evaluation | (1) Melt flowability MFR (g/10 min) | | 16 | 20 | 24 | 14 | 17 | 8 | 18 |
| | (2) IZOD impact strength (kJ/m²) | | 60 | 60 | 65 | 75 | 45 | 55 | 60 |
| | (3) Flame retardancy 94 UL-94 | test piece 1.5 mm thick | V-2NG | V-2NG | V-2NG | V-2NG | V-0 | V-0 | V-0 |
| | | test piece 2.5 mm thick | V-2NG | V-0 | V-1 | V-0 | V-0, 5VB | V-0, 5VB | V-0, 5VB |
| | (4) Grease resistance | | 1.2 | 1.2 | 1.5 | 1.2 | 1.5 | 1.3 | 1.3 |
| | (5) Recyclability | Izod impact strength (kJ/m²) | 55 | 50 | 55 | 70 | 35 | 45 | 50 |
| | | color change (ΔE) | 1.5 | 1.3 | 2.2 | 1.4 | 2.0 | 3.0 | 1.8 |

| | | | Co. Ex. 8 | Co. Ex. 9 | Co. Ex. 10 | Co. Ex. 11 | Co. Ex. 12 | Co. Ex. 13 |
|---|---|---|---|---|---|---|---|---|
| Composition | (A) | PC-1: A1500 | | | 45 | | | |
| | | PC-3: A1900 | 90 | 90 | 45 | 90 | | |
| | | Terminal-modified PC | | | | | 100 | 90 |
| | | PC-PDMS | | | | | | |
| | | Terminal-modified PC-PDMS | | | | | | |
| | | PDMS content of resin (A) (wt. %) | 0 | 0 | 0 | 0 | 0 | 0 |
| | (E) | HIPS | 10 | 10 | 10 | 10 | | 10 |
| | | ABS | | | | | | |
| | (D) | PTFE | 0.5 | 0.5 | 0.5 | 0.5 | 0.5 | |
| | (B) | Silicone-1 | | 4 | 4 | 4 | 4 | 4 |
| | | Silicone-2 | | | | | | |
| | (F) | Talc | | | | | 10 | |
| Evaluation | (1) Melt flowability: MFR (g/10 min) | | 6 | 8 | 12 | 6 | 3 | 20 |
| | (2) IZOD impact strength (kJ/m²) | | 60 | 65 | 20 | 40 | 10 | 60 |
| | (3) Flame retardancy 94 UL-94 | test piece 1.5 mm thick | V-2NG | V-2NG | V-2NG | V-0 | V-0 | V-2NG |
| | | test piece 2.5 mm thick | V-2NG | V-0 | V-0 | V-0, 5VB | V-0, 5VB | V-2NG |
| | (4) Grease resistance | | 1.2 | 1.2 | 0.6 | 1.0 | 0.4 | 1.2 |
| | (5) Recyclability | IZOD impact strength (kJ/m²) | 55 | 60 | 10 | 35 | 3 | 50 |
| | | color change (ΔE) | 1.5 | 1.4 | 1.5 | 3.1 | 1.4 | 1.4 |

From the data in Tables II-1 and II-2, it is obvious that the moldability (melt flowability) of the polycarbonate resin composition of the invention is good and the moldings of the composition have high impact strength. In addition, the resin moldings are resistant to grease and are recyclable.

[III] Third Aspect of the Invention:

The component (A) of the resin composition of the third aspect of the invention (in this section, the "third aspect of the invention" will be simply referred to as "the invention")

carbonate moiety of structural units of the following structural formula (III-3) and a polyorganosiloxane moiety of structural units of the following structural formula (III-4) in the molecule.

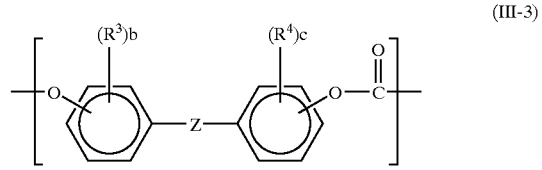

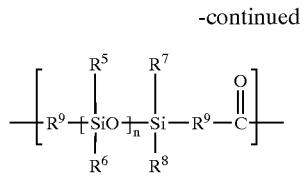

(III-4)

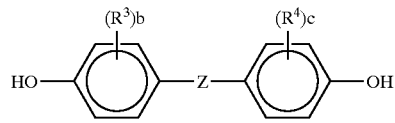

(III-6)

In these, $R^3$ and $R^4$ each represent an alkyl group having from 1 to 6 carbon atoms, or a phenyl group, and they may be the same or different. $R^5$ to $R^8$ each represent an alkyl group having from 1 to 6 carbon atoms, or a phenyl group, preferably a methyl group. $R^5$ to $R^8$ may be the same or different.

$R^9$ represents an aliphatic or aromatic organic residue, preferably an o-allylphenol residue, a p-hydroxystyrene residue or a eugenol residue.

Z represents a single bond, an alkylene group having from 1 to 20 carbon atoms, an alkylidene group having from 1 to 20 carbon atoms, a cycloalkylene group having from 5 to 20 carbon atoms, or a cycloalkylidene group having from 5 to 20 carbon atoms, or a bond of —$SO_2$—, —SO—, —S—, —O— or —CO—. Preferably, it is an isopropylidene group.

b and c each indicate an integer of from 0 to 4, preferably 0. n indicates an integer of from 1 to 500, preferably from 5 to 100.

The PC-PDMS copolymer may be produced, for example, by dissolving a previously-prepared aromatic polycarbonate oligomer (hereinafter abbreviated as PC oligomer), which is to form the aromatic polycarbonate moiety of the copolymer, and a previously-prepared polyorganosiloxane terminated with a reactive group such as an o-allylphenol, p-hydroxystyrene or eugenol residue (reactive PDMS), which is to form the polyorganosiloxane moiety of the copolymer, in a solvent such as methylene chloride, chlorobenzene or chloroform, then adding thereto an aqueous alkali hydroxide solution of a diphenol, and reacting them in a mode of interfacial polycondensation in the presence of a tertiary amine (e.g., triethylamine) or a quaternary ammonium salt (e.g., trimethylbenzylammonium chloride) serving as a catalyst and in the presence of an ordinary terminal stopper of a phenol compound of the following general formula (III-5):

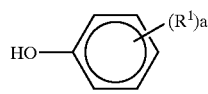

(III-5)

wherein $R^1$ and a have the same meanings as above.

Concretely, for example, the terminal stopper includes phenol, p-cresol, p-tert-butylphenol, p-tert-octylphenol, p-cumylphenol, p-nonylphenol, p-tert-amylphenol, bromophenol, tribromophenol, pentabromophenol. For it, preferred are non-halogen compounds for protecting the environment.

The PC oligomer to be used in producing the PC-PDMS copolymer is readily prepared, for example, by reacting a diphenol of the following general formula (III-6):

wherein $R^3$, $R^4$, Z, b and c have the same meanings as above, with a carbonate precursor such as phosgene or a carbonate compound, in a solvent such as methylene chloride.

Concretely, for example, it may be prepared through reaction of a diphenol with a carbonate precursor such as phosgene or through interesterification of a carbonate precursor such as diphenyl carbonate with a diphenol, in a solvent such as methylene chloride.

The diphenol of formula (III-6) includes, for example, 4,4'-dihydroxydiphenyl; bis(4-hydroxyphenyl)alkanes such as 1,1-bis(4-hydroxyphenyl)methane, 1,1-bis( 4-hydroxyphenyl)ethane, 2,2-bis(4-hydroxyphenyl)propane; bis(4-hydroxyphenyl) oxide; bis(4-hydroxyphenyl) sulfide; bis(4-hydroxyphenyl) sulfone; bis(4-hydroxyphenyl) sulfoxide; bis(4-hydroxyphenyl) ether; and bis( 4-hydroxyphenyl) ketone. Of those, preferred is 2,2-bis( 4-hydroxyphenyl) propane (bisphenol A). Singly or as combined, one or more of these diphenols may be used for the reaction.

The carbonate compound includes, for example, diaryl carbonates such as diphenyl carbonate; and dialkyl carbonates such as dimethyl carbonate, diethyl carbonate.

In the invention, the PC oligomer for use in producing the PC-PDMS copolymer may be a homopolymer or copolymer with one or more diphenols mentioned above. In addition, it may also be a thermoplastic random branched polycarbonate prepared by combining the diphenol with a polyfunctional aromatic compound. For it, the branching agent (polyfunctional aromatic compound) includes, for example, 1,1,1-tris (4-hydroxyphenyl)ethane, α,α'α"-tris(4-hydroxyphenyl)-1, 3,5-triisopropylbenzene, 1-[α-methyl-α-(4'-hydroxyphenyl) ethyl]-4-[α',α'-bis( 4"-hydroxyphenyl)ethyl]benzene, phloroglucine, trimellitic acid, isatin-bis(o-cresol).

The component (A) may be produced in the manner as above, but in general, it contains a by-product of aromatic polycarbonate. Accordingly, the component (A) produced in the manner as above is an aromatic polycarbonate resin that contains PC-PDMS copolymer, and its viscosity-average molecular weight preferably falls between 10,000 and 40,000 as a whole, more preferably between 12,000 and 30,000. Also preferably, the polyorganosiloxane content of the component (A) is from 0.5 to 10% by weight of the total polycarbonate resin that contains the component (A).

The polymer produced according to the method mentioned above is terminated by the group of formula (III-1) substantially at one or both ends of the molecule.

The component (B) of the resin composition of the invention is an aromatic polycarbonate having a terminal group of formula (III-2) mentioned above (this is hereinafter abbreviated as terminal-modified polycarbonate), and its viscosity-average molecular weight preferably falls between 10,000 and 40,000, more preferably between 12,000 and 30,000.

In formula (III-2), $R^2$ is an alkyl group having from 21 to 35 carbon atoms, and it may be linear or branched.

In this, the alkyl group may be at any of p-, m- or opposition, but is preferably at p-position.

The terminal-modified polycarbonate may be readily prepared by reacting a diphenol with phosgene or a carbonate compound.

Concretely, for example, it is prepared through reaction of a diphenol with a carbonate precursor such as phosgene or through interesterification of a carbonate precursor such as diphenyl carbonate with a diphenol, in a solvent such as methylene chloride in the presence of a catalyst such as triethylamine and a specific terminal stopper.

The diphenol may be the same as the compound of formula (III-6), or may differ from it. The terminal-modified polycarbonate may be a homopolymer or copolymer with one or more diphenols mentioned above. In addition, it may also be a thermoplastic random branched polycarbonate prepared by combining the diphenol with a polyfunctional aromatic compound.

Examples of the carbonate compound are diaryl carbonates such as diphenyl carbonate, and dialkyl carbonates such as dimethyl carbonate, diethyl carbonate.

For the terminal stopper, used are phenol compounds capable of forming a terminal group of formula (III-2). For example, used are phenol compounds of the following general formula (III-7) in which $R^2$ has the same meaning as above.

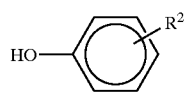
(III-7)

Examples of such alkylphenols are docosylphenol, tetracosylphenol, hexacosylphenol, octacosylphenol, triacontylphenol, dotriacontylphenol and tetratriacontylphenol. Singly or as combined, one or more of these alkylphenols may be used herein. Not interfering with the effect of the invention, the alkylphenol may be combined with any other phenol such as an alkylphenol having at most 20 carbon atoms.

The aromatic polycarbonate produced according to the method mentioned above is terminated by the group of formula (III-2) substantially at one or both ends of the molecule.

The aromatic polycarbonate resin containing the components (A) and (B) is prepared by mixing the aromatic polycarbonate resin containing the component (A) with the component (B). If desired, it may contain any other ordinary aromatic polycarbonate resin. Preferably, however, the viscosity-average molecular weight of the additional aromatic polycarbonate resin falls between 10,000 and 40,000, more preferably between 12,000 and 30,000. The aromatic polycarbonate resin may be prepared in the same manner as that for preparing the component (B), using, as the terminal stopper, the ordinary phenol compound of formula (III-5). The diphenol for it may be the same as or different from the diphenol of formula (III-6) to be used in producing the component (A) as well as the diphenol used in producing the component (B).

Preferably, the viscosity-average molecular weight of the total aromatic polycarbonate resin that contains the components (A) and (B) falls between 10,000 and 40,000, more preferably between 12,000 and 30,000, even more preferably between 14,000 and 26,000. If its molecular weight is too low, the mechanical strength of the resin composition of the invention will be low; but if too high, the flowability of the resin composition of the invention will be poor.

The polyorganosiloxane content of the component (A) preferably falls between 0.1 and 2% by weight of the total aromatic polycarbonate resin that contains the components (A) and (B) for better flame retardancy of the resin composition of the invention. More preferably, it falls between 0.2 and 1.5% by weight, even more preferably between 0.5 and 1.3% by weight.

Also preferably, the amount of the component (B), polycarbonate is at least 10% by weight of the total aromatic polycarbonate resin that contains the components (A) and (B), more preferably between 30 and 90% by weight, even more preferably between 40 and 80% by weight. If the amount of the component (B) is smaller than 10% by weight, the flowability of the composition of the invention could not be increased.

The component (C), fibril-forming polytetrafluoroethylene having a mean molecular weight of at least 500,000 (hereinafter this is abbreviated as PTFE) to be in the resin composition of the invention is for enhancing the ability of the resin composition not to drip in melt, and it therefore enhances the flame retardancy of the composition. Its mean molecular weight must be at least 500,000, and is preferably from 500,000 to 10,000,000, more preferably from 1,000,000 to 10,000,000.

The amount of the component (C) in the resin composition is from 0.05 to 1 part by weight, preferably from 0.1 to 0.5 parts by weight relative to 100 parts by weight of the aromatic polycarbonate resin therein that contains the components (A) and (B). If the amount is larger than 1 part by weight, it is unfavorable since too much PTFE will have negative influences on the impact resistance and the appearance of the resin moldings and, in addition, the resin strands containing too much PTFE will meander when the resin composition is kneaded and extruded out, and if so, it is impossible to stably produce resin pellets. On the other hand, if its amount is smaller than 0.05 parts by weight, the component (C) will be ineffective for melt drip inhibition. Within the preferred range, the component (C) is more effective for melt drip inhibition and enhances the flame retardancy of the resin composition.

The fibril-forming PTFE for the component (C) is not specifically defined, including, for example, Teflon 6-J (trade name from Mitsui-DuPont Fluorochemical), Polyflon D-1 and Polyflon F-103 (trade names from Daikin Industry), Argoflon F5 (trade name from Montefluos), Polyflon MPA, FA-100 (trade names from Daikin Industry). These polytetrafluoroethylenes (PTFE) may be used either singly or as combined.

The fibril-forming polytetrafluoroethylene (PTFE) as above may be obtained, for example, by polymerizing tetrafluoroethylene in an aqueous solvent in the presence of sodium, potassium or ammonium peroxydisulfide, under a pressure falling between 7 and 700 kPa, at a temperature falling between 0 and 200° C., preferably between 20 and 100° C.

The component (D) of the resin composition of the invention is an aromatic polycarbonate-polyorganosiloxane copolymer having a terminal group of formula (III-2') mentioned above (this is hereinafter abbreviated as terminal-modified PC-PDMS copolymer).

In formula (III-2'), $R^{2'}$ is an alkyl group having from 21 to 35 carbon atoms, which is the same as $R^2$ mentioned above.

The terminal-modified PC-PDMS copolymer is a copolymer that comprises an aromatic polycarbonate moiety and a polysiloxane moiety, and its skeleton except the terminal group is the same as that of PC-PDMS in the first aspect of the invention. For it, preferred are copolymers having an aromatic polycarbonate moiety of structural units of the above-mentioned structural formula (III-3) and a polyorganosiloxane moiety of structural units of the above-mentioned structural formula (III-4) in the molecule.

Like the PC-PDMS copolymer mentioned above, the terminal-modified PC-PDMS copolymer may be produced, for example, by dissolving a previously-prepared aromatic polycarbonate oligomer (hereinafter abbreviated as PC oligomer), which is to form the aromatic polycarbonate moiety of the copolymer, and a previously-prepared polyorganosiloxane terminated with a reactive group such as an o-allylphenol, p-hydroxystyrene or eugenol residue (reactive PDMS), which is to form the polyorganosiloxane moiety of the copolymer, in a solvent such as methylene chloride, chlorobenzene or chloroform, then adding thereto an aqueous alkali hydroxide solution of a diphenol, and reacting them in a mode of interfacial polycondensation in the presence of a tertiary amine (e.g., triethylamine) or a quaternary ammonium salt (e.g., trimethylbenzylammonium chloride) serving as a catalyst and in the presence of a terminal stopper of a phenol compound of the following general formula (III-7'):

(III-7')

wherein $R^{2\prime}$ has the same meaning as above.

In formula (III-7'), $R^{2\prime}$ has the same meaning as $R^2$ mentioned above.

The PC oligomer to be used in producing the terminal-modified PC-PDMS copolymer is readily prepared, for example, by reacting a diphenol of formula (III-6) with a carbonate precursor such as phosgene or a carbonate compound in a solvent such as methylene chloride.

Concretely, for example, it may be prepared through reaction of a diphenol with a carbonate precursor such as phosgene or through interesterification of a carbonate precursor such as diphenyl carbonate with a diphenol, in a solvent such as methylene chloride.

The carbonate compound includes, for example, diaryl carbonates such as diphenyl carbonate; and dialkyl carbonates such as dimethyl carbonate, diethyl carbonate.

In the invention, the PC oligomer for use in producing the terminal-modified PC-PDMS copolymer may be a homopolymer or copolymer with one or more diphenols mentioned above. In addition, it may also be a thermoplastic random branched polycarbonate prepared by combining the diphenol with a polyfunctional aromatic compound. For it, the branching agent (polyfunctional aromatic compound) includes, for example, 1,1,1-tris(4-hydroxyphenyl)ethane, α,α'α"-tris( 4-hydroxyphenyl)-1,3,5-triisopropylbenzene, 1-[α-methyl-α-( 4'-hydroxyphenyl)ethyl]-4-[α',α'-bis( 4'-hydroxyphenyl)ethyl]benzene, phloroglucine, trimellitic acid, isatin-bis(o-cresol).

The component (D) may be produced in the manner as above, but in general, it contains a by-product of aromatic polycarbonate having a terminal group of formula (III-2') (this is hereinafter abbreviated as terminal-modified polycarbonate). Accordingly, the component (D) produced in the manner as above is an aromatic polycarbonate resin that contains the terminal-modified PC-PDMS copolymer, and its viscosity-average molecular weight preferably falls between 10,000 and 40,000 as a whole, more preferably between 12,000 and 30,000.

Also preferably, the polyorganosiloxane content of the component (D) is from 0.5 to 10% by weight of the total aromatic polycarbonate resin that contains the component (D).

The polymer produced according to the method mentioned above is terminated by the group of formula (III-2') substantially at one or both ends of the molecule.

In the invention, the aromatic polycarbonate resin containing the component (D), which is produced according to the method mentioned above, may be directly used as it is. If desired, however, it may be combined with any other ordinary aromatic polycarbonate resin or an additional terminal-modified aromatic polycarbonate resin produced separately from it. In that case, the sum of the amount of the terminal-modified PC-PDMS copolymer for the component (D) and the amount of the terminal-modified polycarbonate is preferably at least 10% by weight of the total aromatic polycarbonate resin that contains the component (D), more preferably at least 30% by weight, even more preferably at least 50% by weight. If it is smaller than 10% by weight, the flowability of the composition of the invention could not be improved. Also preferably, the additional aromatic polycarbonate resin has a viscosity-average molecular weight of from 10,000 to 40,000, more preferably from 12,000 to 30,000.

The aromatic polycarbonate resin is not specifically defined, and may be readily produced by reacting a diphenol with phosgene or a carbonate compound.

Concretely, for example, it may be produced by reacting a diphenol with a carbonate precursor such as phosgene or by interesterifying a carbonate precursor such as diphenyl carbonate with a diphenol, in a solvent such as methylene chloride in the presence of a catalyst such as triethylamine and a terminal stopper.

The diphenol may be the same as or different from the compound of formula (III-6) used in producing the component (D). The polycarbonate may be a homopolymer for which one and the same diphenol is used, or a copolymer for which two or more different types of diphenols are used. Further, it may also be a thermoplastic random-branched polycarbonate for which the diphenol is combined with a polyfunctional aromatic compound.

Examples of the dicarbonate compound are diaryl carbonates such as diphenyl carbonate, and dialkyl carbonates such as dimethyl carbonate or diethyl carbonate.

The terminal stopper for ordinary aromatic polycarbonate resin includes, for example, phenol, p-tert-butylphenol, p-tert-octylphenol, p-cumylphenol, p-nonylphenol, p-tert-amylphenol, bromophenol, tribromophenol, pentabromophenol. For the terminal-modified aromatic polycarbonate resin, the phenol compound of formula (III-7') is used for the terminal stopper.

Preferably, the viscosity-average molecular weight of the total aromatic polycarbonate resin that contains the component (D) falls between 10,000 and 40,000, more preferably between 12,000 and 30,000, even more preferably between 14,000 and 26,000. If its molecular weight is too low, the mechanical strength of the resin composition of the invention will be low; but if too high, the flowability of the resin composition of the invention will be poor.

The polyorganosiloxane content of the component (D) preferably falls between 0.1 and 2% by weight of the total aromatic polycarbonate resin that contains the component (D) for better flame retardancy of the resin composition of the invention. More preferably, it falls between 0.2 and 1.5% by weight, even more preferably between 0.5 and 1.3% by weight.

The component (C), fibril-forming polytetrafluoroethylene having a mean molecular weight of at least 500,000 (hereinafter this is abbreviated as PTFE) to be in the resin composition of the invention is for enhancing the ability of the resin composition not to drip in melt, and it therefore enhances the flame retardancy of the composition. Its mean molecular weight must be at least 500,000, and is preferably from 500,000 to 10,000,000, more preferably from 1,000,000 to 10,000,000.

The amount of the component (C) in the resin composition is from 0.05 to 1 part by weight, preferably from 0.1 to 0.5 parts by weight relative to 100 parts by weight of the aromatic polycarbonate resin therein that contains the component (D). If the amount is larger than 1 part by weight, it is unfavorable since too much PTFE will have negative influences on the impact resistance and the appearance of the resin moldings and, in addition, the resin strands containing too much PTFE will meander when the resin composition is kneaded and extruded out, and if so, it is impossible to stably produce resin pellets. On the other hand, if its amount is smaller than 0.05 parts by weight, the component (C) will be ineffective for melt drip inhibition. Within the preferred range, the component (C) is more effective for melt drip inhibition and enhances the flame retardancy of the resin composition.

The fibril-forming PTFE for the component (C) is not specifically defined, including those mentioned hereinabove for the first aspect of the invention, and it may be produced in the same manner as hereinabove.

Further if desired, the resin composition of the invention may contain various types of inorganic fillers, additives, other synthetic resins and elastomers not interfering with the object of the invention [these are hereinafter abbreviated as component (E)].

The inorganic filler may be in the polycarbonate resin composition for enhancing the mechanical strength and the durability of the composition and for increasing the amount of the composition. It includes, for example, glass fibers (GF), carbon fibers, glass beads, glass flakes, carbon black, calcium sulfate, calcium carbonate, calcium silicate, titanium oxide, alumina, silica, asbestos, talc, clay, mica, quartz powder. The additives are, for example, antioxidants such as hindered phenol compounds, phosphorus-containing compounds (e.g., phosphites, phosphates), amine compounds; UV absorbents such as benzotriazole compounds, benzophenone compounds; lubricants such as aliphatic carboxylates, paraffin, silicone oil, polyethylene wax; mold release agents, antistatic agents and colorants.

Additional synthetic resins that may be in the resin composition of the invention are, for example, polyethylene, polypropylene, polystyrene, AS resin (acrylonitrile-styrene copolymer), ABS resin (acrylonitrile-butadiene-styrene copolymer), and polymethyl methacrylate. The elastomers are, for example, isobutylene-isoprene rubber, styrene-butadiene rubber, ethylene-propylene rubber, and acrylic elastomers.

The resin composition of the invention may be produced by mixing and kneading the above-mentioned components optionally with (E).

Formulating and mixing the constituent components into the intended resin composition may be effected in any known manner, for example, using a ribbon blender, a drum tumbler, a Henschel mixer, a Banbury mixer, a single-screw extruder, a double-screw extruder, a cokneader or a multi-screw extruder. The temperature at which the components are mixed and kneaded generally falls between 240 and 320° C.

Having been prepared in the manner as above, the polycarbonate resin composition of the invention may be molded in various molding methods of, for example, injection molding, blow molding, extrusion molding, compression molding, calendering, spin molding. The resulting moldings are favorable to housings and parts of electric and electronic appliances that are required to be resistant to flames.

The invention is described more concretely with reference to its Production Examples, Examples and Comparative Examples, which, however, are not intended to restrict the scope of the invention.

PRODUCTION EXAMPLE III-1

[Preparation of Alkylphenol (a)]

Starting compounds, 300 parts by weight of phenol and 110 parts by weight of 1-docosene in a molar ratio of phenol/olefin=9/1, and 11 parts by weight of a catalyst, strong-acid polystyrenic sulfonate cation resin (Amberlyst 15 from Rohm and Haas) were put into a reactor equipped with a baffle and a stirring blade, and reacted at 120° C. with stirring for 3 hours. After the reaction, the mixture was purified through distillation under reduced pressure to obtain an alkylphenol (a). In the resulting alkylphenol (a), the alkyl group had 22 carbon atoms.

PRODUCTION EXAMPLE III-2

[Production of PC Oligomer]

60 kg of bisphenol A was dissolved in 400 liters of aqueous 5 wt. % sodium hydroxide solution to prepare an aqueous solution of bisphenol A in sodium hydroxide.

Next, the aqueous solution of bisphenol A in sodium hydroxide kept at room temperature was fed into a tubular reactor having an inner diameter of 10 mm and a length of 10 m, at a flow rate of 138 liters/hr via an orifice plate of the reactor, along with methylene chloride thereinto via the plate at a flow rate of 69 liters/hr, while, at the same time, phosgene was also thereinto at a flow rate of 10.7 kg/hr, and they were continuously reacted for 3 hours. The tubular reactor used herein is a jacketed tube, in which cooling water was circulated through the jacket so as to keep the reaction mixture discharge at 25° C. The pH of the discharge was controlled to fall between 10 and 11.

The thus-obtained reaction mixture was kept static for phase separation. Its aqueous phase was removed, and its methylene chloride phase (220 liters) was collected to obtain a PC oligomer (concentration, 317 g/liter). The degree of polymerization of the PC oligomer fell between 2 and 4, and the chloroformate concentration thereof was 0.7 normalities.

PRODUCTION EXAMPLE III-3-1

[Production of Reactive PDMS-A]

1483 g of octamethylcyclotetrasiloxane, 96 g of 1,1,3,3-tetramethyldisiloxane and 35 g of 86% sulfuric acid were mixed and stirred at room temperature for 17 hours. The resulting oily phase was separated, and 25 g of sodium hydrogencarbonate was added thereto and stirred for 1 hour. After filtered, this was distilled in vacuum of 3 Torr ($4 \times 10^2$ Pa) at 150° C. to remove the low-boiling fraction, and the residual oil was collected.

To a mixture of 60 g of 2-allylphenol and 0.0014 g of a platinum compound, platinum chloride-alcoholate complex, added was 294 g of the oil at 90° c. While kept at 90 to 115° C., the resulting mixture was stirred for 3 hours. The resulting product was extracted with methylene chloride and washed three times with aqueous 80% methanol to remove the excess 2-allylphenol. This was dried with anhydrous sodium sulfate and then heated in vacuum at 115° C. to remove the solvent.

Through its NMR, the thus-obtained, phenol-terminated PDMS was found to have 30 repetitive dimethylsilanoxy units.

PRODUCTION EXAMPLE III-3-2

[Production of Reactive PDMS-B]

This is the same as in Production Example III-3-1, in which, however, 73.4 g of eugenol was used in place of 60 g of 2-allylphenol.

Through its NMR, the phenol-terminated PDMS obtained herein was found to have 30 repetitive dimethylsilanoxy units.

PRODUCTION EXAMPLE III-3-3

[Production of Reactive PDMS-C]

This is the same as in Production Example III-3-1, in which, however, 18.1 g of 1,1,3,3-tetramethyldisiloxane was used.

Through its NMR, the phenol-terminated PDMS obtained herein was found to have 150 repetitive dimethylsilanoxy units.

PRODUCTION EXAMPLE III-4-1

[Production of PC-PDMS Copolymer $A_1$]

138 g of the reactive PDMS-A obtained in Production Example III-3-1 was dissolved in 2 liters of methylene chloride, and this was mixed with 10 liters of the PC oligomer obtained in the above. To this were added a solution of 26 g of sodium hydroxide in 1 liter of water and 5.7 cc of triethylamine, and these were reacted by stirring at 500 rpm at room temperature for 1 hour.

To the resulting reaction system, added were a solution of 600 g of bisphenol A dissolved in 5 liters of aqueous 5.2 wt. % sodium hydroxide, 8 liters of methylene chloride, and 96 g of p-tert-butylphenol, and these were reacted by stirring at 500 rpm at room temperature for 2 hours.

5 liters of methylene chloride was added to the resulting reaction system, which was then washed with 5 liters of water, 5 liters of an alkali, 0.03-N sodium hydroxide, 5 liters of an acid, 0.2-N hydrochloric acid, and 5 liters of water (two times) in that order. Finally, methylene chloride was removed from this, and a flaky PC-PDMS copolymer $A_1$ was obtained. The thus-obtained PC-PDMS copolymer $A_1$ was dried in vacuum at 120° C. for 24 hours. Its viscosity-average molecular weight was 17,000, and its PDMS content was 3.0% by weight. The viscosity-average molecular weight and the PDMS content were measured as follows:

(1) Viscosity-Average Molecular Weight (Mv):

The viscosity of the copolymer in methylene chloride at 20° C. was measured with an Ubbelohde's viscometer, and the intrinsic viscosity [η] thereof was derived from it. The viscosity-average molecular weight (Mv) of the copolymer was calculated according to the following equation:

$$[\eta]=1.23\times10^{-5} Mv^{0.83}.$$

(2) PDMS Content:

Based on the intensity ratio of the methyl peak of the isopropyl group of bisphenol A seen at 1.7 ppm in $^1$H-NMR of the copolymer to the methyl peak of the dimethylsiloxane moiety seen at 0.2 ppm therein, the PDMS content of the copolymer was obtained.

PRODUCTION EXAMPLE III-4-2

[Production of PC-PDMS Copolymer $A_2$]

A flaky PC-PDMS copolymer $A_2$ was obtained in the same manner as in Production Example III-4-1, for which, however, 91 g of the reactive PDMS-B was used in place of 138 g of the reactive PDMS-A and 136 g of p-cumylphenol was used in place of 96 g of p-tert-butylphenol. Its viscosity-average molecular weight was 16,800, and its PDMS content was 2.0% by weight.

PRODUCTION EXAMPLE III-4-3

[Production of PC-PDMS Copolymer $A_3$]

A flaky PC-PDMS copolymer $A_3$ was obtained in the same manner as in Production Example III-4-1, for which, however, the reactive PDMS-C was used in place of the reactive PDMS-A. Its viscosity-average molecular weight was 17,200, and its PDMS content was 3.0% by weight.

PRODUCTION EXAMPLE III-5-1

[Production of Terminal-modified Polycarbonate $B_1$]

10 liters of the PC oligomer obtained in Production Example III-2 was put into a 50-liter reactor equipped with a stirrer, and 249 g of the alkylphenol (a) prepared in Production Example III-1 was dissolved therein. Next, aqueous sodium hydroxide solution (sodium hydroxide 53 g, water 1 liter) and 5.8 cc of triethylamine were added thereto and reacted by stirring at 300 rpm for 1 hour. Then, the system was mixed with a solution of bisphenol A in sodium hydroxide (bisphenol A 720 g, sodium hydroxide 412 g, water 5.5 liters), 8 liters of methylene chloride was added thereto, and these were reacted by stirring at 500 rpm for 1 hour. After the reaction, 7 liters of methylene chloride and 5 liters of water were added to the system, and stirred at 500 rpm for 10 minutes. After stirring was stopped, the system was kept static for phase separation into an organic phase and an aqueous phase. The resulting organic phase was washed with 5 liters of an alkali (0.03-N NaOH), 5 liters of an acid (0.2-N HCl) and 5 liters of water (twice) in that order. Next, methylene chloride was evaporated away to obtain a flaky polymer. Its viscosity-average molecular weight was 17,500.

PRODUCTION EXAMPLE III-5-2

[Production of Polycarbonate $B_2$]

A flaky polymer was obtained in the same manner as in Production Example III-5-1, for which, however, 136 g of p-n-nonylphenol was used in place of the alkylphenol (a). Its viscosity-average molecular weight was 17,400.

PRODUCTION EXAMPLE III-6-1

[Production of Terminal-modified PC-PDMS Copolymer $A_4$]

46 g of the reactive PDMS-A obtained in Production Example III-3-1 was dissolved in 2 liters of methylene chloride, and this was mixed with 10 liters of the PC oligomer obtained in Production Example III-2. To this were added a solution of 26 g of sodium hydroxide in 1 liter of water and 5.7 cc of triethylamine, and these were reacted by stirring at 500 rpm at room temperature for 1 hour.

To the resulting reaction system, added were a solution of 600 g of bisphenol A dissolved in 5 liters of aqueous 5.2 wt. % sodium hydroxide, 8 liters of methylene chloride, and 249 g of the alkylphenol (a), and these were reacted by stirring at 500 rpm at room temperature for 2 hours.

5 liters of methylene chloride was added to the resulting reaction system, which was then washed with 5 liters of water, 5 liters of an alkali, 0.03-N sodium hydroxide, 5 liters of an acid, 0.2-N hydrochloric acid, and 5 liters of water (two times) in that order. Finally, methylene chloride was removed from this, and a flaky terminal-modified PC-PDMS copolymer $A_4$ was obtained. This was dried in vacuum at 120° C. for 24 hours. Its viscosity-average molecular weight was 17,500, and its PDMS content was 1.0% by weight.

PRODUCTION EXAMPLE III-6-2

[Production of Terminal-modified PC-PDMS Copolymer $A_5$]

A flaky terminal-modified PC-PDMS copolymer $A_5$ was obtained in the same manner as in Production Example III-6-1, for which, however, 91 g of the reactive PDMS-B was used in place of the reactive PDMS-A. Its viscosity-average molecular weight was 17,000, and its PDMS content was 2.0% by weight.

PRODUCTION EXAMPLE III-6-3

[Production of Terminal-modified PC-PDMS Copolymer $A_6$]

A flaky terminal-modified PC-PDMS copolymer $A_6$ was obtained in the same manner as in Production Example III-6-1, for which, however, 138 g of the reactive PDMS-B was used in place of the reactive PDMS-A. Its viscosity-average molecular weight was 17,000, and its PDMS content was 3.0% by weight.

PRODUCTION EXAMPLE III-6-4

[Production of Terminal-modified PC-PDMS Copolymer $A_7$]

A flaky terminal-modified PC-PDMS copolymer $A_7$ was obtained in the same manner as in Production Example III-61, for which, however, the reactive PDMS-B was used in place of the reactive PDMS-A. Its viscosity-average molecular weight was 17,100, and its PDMS content was 1.0% by weight.

PRODUCTION EXAMPLE III-6-5

[Production of Terminal-modified PC-PDMS Copolymer $A_8$]

A flaky terminal-modified PC-PDMS copolymer $A_8$ was obtained in the same manner as in Production Example III-6-1, for which, however, the reactive PDMS-C was used in place of the reactive PDMS-A. Its viscosity-average molecular weight was 17,200, and its PDMS content was 1.0% by weight.

PRODUCTION EXAMPLE III-6-6

[Production of PC-PDMS Copolymer $A_9$]

A flaky PC-PDMS copolymer $A_9$ was obtained in the same manner as in Production Example III-6-1, for which, however, 96 g of p-tert-butylphenol was used in place of the alkylphenol (a) prepared in Production Example III-1. Its viscosity-average molecular weight was 17,000, and its PDMS content was 1.0% by weight.

PRODUCTION EXAMPLE III-6-7

[Production of PC-PDMS Copolymer $A_{10}$]

A flaky PC-PDMS copolymer $A_{10}$ was obtained in the same manner as in Production Example III-6-1, for which, however, 141 g of p-nonylphenol was used in place of the alkylphenol (a) prepared in Production Example III-1. Its viscosity-average molecular weight was 17,000, and its PDMS content was 1.0% by weight.

EXAMPLES III-1 TO III-3, AND COMPARATIVE EXAMPLES III-1 TO III-4

The PC-PDMS copolymers $A_1$ to $A_3$ and the terminal-modified polycarbonates $B_1$ and $B_2$ that had been prepared in Production Examples, and commercially-available polycarbonate and PTFE were blended in different ratios as in Table III-1 (in this Table and also in the following Tables III-2, III-3 and III-4, "Example III-1" is simply designated as "Example 1" and the same shall apply to Comparative Examples), fed into a vented double-screw extruder (TEM-35B from Toshiba Kikai), kneaded therein at 280° C., and then pelletized. The commercially-available polycarbonate is Idemitsu Petrochemical's Toughlon FN1700A (having a viscosity-average molecular weight of 17,200); and PTFE is Montefluos' Argoflon F5.

To the compositions of Example III-1 and Comparative Example III-1, added was 0.05 parts by weight of an antioxidant, Asahi Denka Industry's PEP36 [bis(2,6-di-tert-butyl-4-methylphenyl)pentaerythritol diphosphite].

The resulting pellets were dried in hot air at 120° C. for 5 hours. Using Toshiba Kikai's IS100EN (injection-molding machine), the pellets were molded at 280° C. into test pieces. The mold temperature was 80° C. These test pieces were tested for their combustibility, Izod impact strength and spiral flow length (SFL) according to the test methods mentioned below. The test results are given in Table III-2.

(1) Combustibility:

This is based on the UL94 Standard. Samples having a thickness of 1.5 mm are tested for vertical combustion according to Underlighters Laboratory Subject 94.

2) Izod Impact Strength:

Measured according to JIS K 7110. Five samples of the same resin composition are tested in the same manner and their data are averaged.

(3) SFL:

The pellets are injection-molded to give a melt flow of 2 mm thick. The injection pressure is 80 kg/cm² (7.84 MPa), the resin temperature is 280° C., and the mold temperature is 80° C.

TABLE III-1

| | PC-PDMS Copolymer | | Terminal-modified PC | | Polycarbonate | | PTFE |
|---|---|---|---|---|---|---|---|
| | type | amount (wt.pts.) | type | amount (wt.pts.) | amount (wt.pts.) | PDMS Content(*1) | amount (wt.pts.) |
| Example 1 | $A_1$ | 33 | $B_1$ | 67 | 0 | 1.0 | 0.3 |
| Example 2 | $A_2$ | 50 | $B_1$ | 50 | 0 | 1.0 | 0.3 |
| Example 3 | $A_3$ | 33 | $B_1$ | 67 | 0 | 1.0 | 0.3 |
| Comp. Ex. 1 | $A_1$ | 33 | — | 0 | 67 | 1.0 | 0.3 |
| Comp. Ex. 2 | $A_2$ | 50 | — | 0 | 50 | 1.0 | 0.3 |
| Comp. Ex. 3 | $A_3$ | 33 | — | 0 | 67 | 1.0 | 0.3 |
| Comp. Ex. 4 | $A_1$ | 33 | $B_2$ | 67 | 0 | 1.0 | 0.3 |

Note)
(*1)This indicates the ratio of polyorganosiloxane to the total polycarbonate resin (% by weight).

TABLE III-2

| | SFL (cm) | Combustibility | Izod Impact Strength (kJ/m$^2$) |
|---|---|---|---|
| Example 1 | 35 | V-0 | 70 |
| Example 2 | 32 | V-0 | 72 |
| Example 3 | 35 | V-0 | 71 |
| Comparative Example 1 | 24 | V-0 | 68 |
| Comparative Example 2 | 22 | V-0 | 67 |
| Comparative Example 3 | 24 | V-0 | 69 |
| Comparative Example 4 | 26 | V-0 | 69 |

EXAMPLES III-4 TO III-8, AND COMPARATIVE EXAMPLES III-5, III-6

The terminal-modified PC-PDMS copolymers $A_4$ to $A_8$ and the PC-PDMS copolymers $A_9$, $A_{10}$ that had been prepared in Production Examples, and commercially-available polycarbonate and PTFE were blended in different ratios as in Table III-3, fed into a vented double-screw extruder (TEM-35B from Toshiba Kikai), kneaded therein at 280° C., and then pelletized. The commercially-available polycarbonate is Idemitsu Petrochemical's Toughlon FN1700A (having a viscosity-average molecular weight of 17,200); and PTFE is Montefluos' Argoflon F5.

To the compositions of Example III-4 and Comparative Example III-5, added was 0.05 parts by weight of an antioxidant, Asahi Denka Industry's PEP36 [bis(2,6-di-tert-butyl-4-methylphenyl)pentaerythritol diphosphite].

The resulting pellets were dried in hot air at 120° C. for 5 hours. Using Toshiba Kikai's IS100EN (injection-molding machine), the pellets were molded at 280° C. into test pieces. The mold temperature was 80° C. These test pieces were tested for their combustibility, Izod impact strength and spiral flow length (SFL) according to the test methods mentioned above. The test results are given in Table III-4.

TABLE III-3

| | Terminal-modified PC-PDMS copolymer | | Polycarbonate | | PTFE |
|---|---|---|---|---|---|
| | type | amount (wt.pts.) | amount (wt.pts.) | PDMS Content (*1) | amount (wt.pts.) |
| Example 4 | $A_4$ | 100 | 0 | 1.0 | 0.3 |
| Example 5 | $A_5$ | 50 | 50 | 1.0 | 0.3 |

TABLE III-3-continued

| | Terminal-modified PC-PDMS copolymer | | Polycarbonate | | PTFE |
|---|---|---|---|---|---|
| | type | amount (wt.pts.) | amount (wt.pts.) | PDMS Content (*1) | amount (wt.pts.) |
| Example 6 | $A_6$ | 33 | 67 | 1.0 | 0.3 |
| Example 7 | $A_7$ | 100 | 0 | 1.0 | 0.3 |
| Example 8 | $A_8$ | 100 | 0 | 1.0 | 0.3 |
| Comp. Ex. 5 | $A_9$ | 100 | 0 | 1.0 | 0.3 |
| Comp. Ex. 6 | $A_{10}$ | 100 | 0 | 1.0 | 0.3 |

Note)
(*1)This indicates the ratio of polyorganosiloxane to the total polycarbonate resin (% by weight).

TABLE III-4

| | SFL (cm) | Combustibility | Izod Impact Strength (kJ/m$^2$) |
|---|---|---|---|
| Example 4 | 40 | V-0 | 70 |
| Example 5 | 32 | V-0 | 72 |
| Example 6 | 30 | V-0 | 72 |
| Example 7 | 39 | V-0 | 69 |
| Example 8 | 39 | V-0 | 70 |
| Comparative Example 5 | 24 | V-0 | 67 |
| Comparative Example 6 | 26 | V-0 | 67 |

From Tables III-2 and III-4, it is understood that the samples of Examples are better than those of Comparative Examples in point of the flowability and the impact resistance.

INDUSTRIAL APPLICABILITY

In its first aspect, the invention provides a colored polycarbonate resin composition of which the advantages are that its flowability is improved not detracting from the impact resistance of the resin moldings, and especially the glossiness of the injection moldings of the resin composition is extremely good. Therefore, the polycarbonate resin composition of the first aspect of the invention is favorable, for example, to colored parts of electric and electronic appliances, electrically-powered tools and cameras.

In its second aspect, the invention provides a polycarbonate resin composition which does not contain a halogen or phosphorus-containing flame retardant but contains only minor additives. The impact resistance, the melt flowability and the flame retardancy of the resin composition and its moldings are all good. In addition, the resin composition and its moldings are well recyclable because of their good recyclability, and the resin composition can be molded into thin-walled and large-sized moldings because of its good moldability. The invention of this aspect therefore contributes towards solving various environmental problems with plastics and saving natural resources. Accordingly, the invention will expand the applicability of polycarbonate resin to electric and electronic appliances including those for household use, OA appliances and information appliances and to automobile parts.

In its third aspect, the invention provides a polycarbonate resin composition of good flowability, impact resistance and flame retardancy. Accordingly, the resin composition of the third aspect of the invention is favorable, for example, to the field of electric and electronic appliances (housings, parts).

What is claimed is:

1. A colored polycarbonate resin composition, comprising:
   (i) 100 parts by weight of a polycarbonate resin comprising
      from 10 to 100% by weight of an aromatic polycarbonate (A) having a terminal group of the following general formula (I-1):

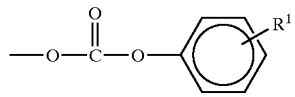
(I-1)

wherein $R^1$ represents a branched alkyl group having from 10 to 35 carbon atoms, and
      from 0 to 90% by weight of an aromatic polycarbonate (B) having a terminal group of the following general formula (I-2):

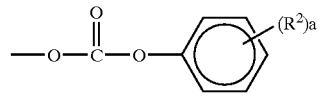
(I-2)

wherein $R^2$ represents an alkyl group having from 1 to 9 carbon atoms, an aryl group having from 6 to 20 carbon atoms, or a halogen atom, and a indicates an integer of from 0 to 5, and
   (ii) from 5 to 150 parts by weight of glass fibers (C);
   (iii) from 100 to 5,000 ppm of a colorant.

2. The polycarbonate resin composition as claimed in claim 1, wherein said colorant is carbon black.

3. The polycarbonate resin composition as claimed in claim 1, wherein the polycarbonate resin has a viscosity-average molecular weight of from 10,000 to 40,000.

4. Parts of electric and electronic appliances, parts of electrically-powered tools or parts of cameras, comprising: the polycarbonate resin composition of claim 1.

5. The polycarbonate resin composition as claimed in claim 1, wherein component (B) is present in said polycarbonate resin.

6. The polycarbonate resin composition as claimed in claim 1, wherein said glass fibers have a length of from 0.1 to 8 mm.

7. The polycarbonate resin composition as claimed in claim 1, wherein said glass fibers have a diameter of from 0.1 to 30 μm.

8. The polycarbonate resin composition as claimed in claim 1, wherein said glass fibers are in the form of rovings, milled fibers, chopped fibers and mixtures thereof.

9. The polycarbonate resin composition as claimed in claim 1, wherein said glass fibers are surface treated.

10. The polycarbonate resin composition as claimed in claim 9, wherein said glass fibers are treated with a sizing agent.

* * * * *

UNITED STATES PATENT AND TRADEMARK OFFICE
CERTIFICATE OF CORRECTION

PATENT NO. : 6,987,141 B2
DATED : January 17, 2006
INVENTOR(S) : Okamoto et al.

It is certified that error appears in the above-identified patent and that said Letters Patent is hereby corrected as shown below:

<u>Title page,</u>
Item [87], should read -- PCT Pub. Data: May 10, 2002 --.

Signed and Sealed this

Twenty-eighth Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,987,141 B2  Page 1 of 1
DATED : January 17, 2006
INVENTOR(S) : Okamoto et al.

It is certified that error appears in the above-identified patent and that said Letters Patent is hereby corrected as shown below:

<u>Title page,</u>
Item [87], should read -- PCT Pub. Date: May 10, 2002 --.

This certificate supersedes Certificate of Correction issued March 28, 2006.

Signed and Sealed this

Twenty-fifth Day of April, 2006

JON W. DUDAS
*Director of the United States Patent and Trademark Office*